(12) United States Patent
Becker et al.

(10) Patent No.: US 12,260,097 B2
(45) Date of Patent: Mar. 25, 2025

(54) REPLACING KEY-VALUE PAIR SETS WITH NEW KEY-VALUE PAIR SETS

(71) Applicant: Micron Technology, Inc., Boise, ID (US)

(72) Inventors: Gregory Alan Becker, Austin, TX (US); Alexander Tomlinson, Austin, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/520,351

(22) Filed: Nov. 27, 2023

(65) Prior Publication Data

US 2024/0176512 A1 May 30, 2024

Related U.S. Application Data

(60) Provisional application No. 63/385,120, filed on Nov. 28, 2022.

(51) Int. Cl.
*G06F 3/06* (2006.01)
(52) U.S. Cl.
CPC .......... *G06F 3/0622* (2013.01); *G06F 3/0655* (2013.01); *G06F 3/0679* (2013.01)

(58) Field of Classification Search
CPC ..... G06F 3/0622; G06F 3/0655; G06F 3/0679
See application file for complete search history.

(56) References Cited

U.S. PATENT DOCUMENTS

| | | | |
|---|---|---|---|
| 11,747,998 B1 * | 9/2023 | Indupuru | G06F 3/061 711/164 |
| 2017/0277452 A1 * | 9/2017 | Joshi | G06F 3/0679 |

* cited by examiner

*Primary Examiner* — Jane W Benner
(74) *Attorney, Agent, or Firm* — Harrity & Harrity, LLP

(57) ABSTRACT

In some implementations, a memory device may determine, from a list of key-value pair sets, a key-value pair set. The memory device may identify, from the key-value pair set selected from the list of key-value pair sets, a first key that is included in at least one other key-value pair set from the list of key-value pair sets. The memory device may identify, from the key-value pair set selected from the list of key-value pair sets, a second key that is not included in at least one other key-value pair set from the list of key-value pair sets. The memory device may form a new key-value pair set that excludes the first key and includes the second key. The memory device may replace the key-value pair set selected from the list of key-value pair sets with the new key-value pair set.

20 Claims, 12 Drawing Sheets

| # | NODE | IDX | DGEN | COMP | KEYS | TOMBS | PTOMBS | HLEN | KLEN | VLEN | HBLK | KBLK | VBLK | VGRP | RULE | ID | EKL | EKHEX |
|---|---|---|---|---|---|---|---|---|---|---|---|---|---|---|---|---|---|---|
| k | 3 | 0 | 10996 | 0 | 349.4k | 0 | 0 | 24.5k | 2.7m | 363.4m | 1 | 1 | 11 | 1 | rspill | 1 | 5 | - |
| k | 3 | 1 | 10990 | 0 | 312.1k | 0 | 0 | 24.5k | 2.4m | 324.6m | 1 | 1 | 10 | 1 | rspill | 1 | 5 | - |
| k | 3 | 2 | 10985 | 0 | 309.0k | 0 | 0 | 24.5k | 2.4m | 321.4m | 1 | 1 | 10 | 1 | rspill | 1 | 5 | - |
| k | 3 | 3 | 10980 | 1 | 1.1m | 0 | 0 | 24.5k | 9.2m | 1.1g | 1 | 1 | 39 | 4 | lenk | 1 | 5 | - |
| k | 3 | 4 | 10960 | 1 | 1.1m | 0 | 0 | 24.5k | 9.5m | 1.2g | 1 | 1 | 40 | 4 | lenk | 1 | 5 | - |
| k | 3 | 5 | 10940 | 1 | 1.3m | 0 | 0 | 24.5k | 10.6m | 1.3g | 1 | 1 | 44 | 4 | lenk | 1 | 5 | - |
| k | 3 | 6 | 10920 | 2 | 5.1m | 0 | 0 | 24.5k | 41.4m | 5.3g | 1 | 4 | 200 | 17 | lenk | 1 | 5 | - |
| k | 3 | 7 | 10835 | 2 | 4.8m | 0 | 0 | 24.5k | 38.4m | 4.9g | 1 | 4 | 184 | 16 | lenk | 1 | 5 | - |
| k | 3 | 8 | 10755 | 65 | 16.7m | 0 | 0 | 24.5k | 134.2m | 17.4g | 1 | 12 | 521 | 1 | garb | 1 | 5 | - |
| n | 3 | 9 | 10996 | 65 | 1.4m | 0 | 0 | 21.1k | 251.3m | 32.6g | 9 | 26 | 1059 | | | 1 | 5 | - |

| Untouchable | Garbage | Ignored |
|---|---|---|
| 5 | 4321 | |
| 5 | 432 | 1 |
| 5 | 43 | 21 |
| 5 | 4 | 321 |
| 54 | 321 | |
| 54 | 32 | 1 |
| 54 | 3 | 21 |
| 543 | 21 | |
| 543 | 2 | 1 |
| 5432 | 1 | |

REPLACING KEY-VALUE PAIR SETS WITH NEW KEY-VALUE PAIR SETS

CROSS-REFERENCE TO RELATED APPLICATION

This patent application claims priority to U.S. Provisional Patent Application No. 63/385,120, filed on Nov. 28, 2022, entitled "REPLACING KEY-VALUE PAIR SETS WITH NEW KEY-VALUE PAIR SETS," and assigned to the assignee hereof. The disclosure of the prior application is considered part of and is incorporated by reference into this patent application.

TECHNICAL FIELD

The present disclosure generally relates to memory devices, memory device operations, and, for example, to replacing key-value pair sets with new key-value pair sets.

BACKGROUND

A non-volatile memory device, such as a NAND memory device, may use circuitry to enable electrically programming, erasing, and storing of data even when a power source is not applied. Non-volatile memory devices may be used in various types of electronic devices, such as computers, mobile phones, or automobile computing systems, among other examples.

A non-volatile memory device may include an array of memory cells, a page buffer, and a column decoder. In addition, the non-volatile memory device may include a control logic unit (e.g., a controller), a row decoder, or an address buffer, among other examples. The memory cell array may include memory cell strings connected to bit lines, which are extended in a column direction.

A memory cell, which may be referred to as a "cell" or a "data cell," of a non-volatile memory device may include a current path formed between a source and a drain on a semiconductor substrate. The memory cell may further include a floating gate and a control gate formed between insulating layers on the semiconductor substrate. A programming operation (sometimes called a write operation) of the memory cell is generally accomplished by grounding the source and the drain areas of the memory cell and the semiconductor substrate of a bulk area, and applying a high positive voltage, which may be referred to as a "program voltage," a "programming power voltage," or "VPP," to a control gate to generate Fowler-Nordheim tunneling (referred to as "F-N tunneling") between a floating gate and the semiconductor substrate. When F-N tunneling is occurring, electrons of the bulk area are accumulated on the floating gate by an electric field of VPP applied to the control gate to increase a threshold voltage of the memory cell.

An erasing operation of the memory cell is concurrently performed in units of sectors sharing the bulk area (referred to as "blocks"), by applying a high negative voltage, which may be referred to as an "erase voltage" or "Vera," to the control gate and a configured voltage to the bulk area to generate the F-N tunneling. In this case, electrons accumulated on the floating gate are discharged into the source area, so that the memory cells have an erasing threshold voltage distribution.

Each memory cell string may have a plurality of floating gate type memory cells serially connected to each other. Access lines (sometimes called "word lines") are extended in a row direction, and a control gate of each memory cell is connected to a corresponding access line. A non-volatile memory device may include a plurality of page buffers connected between the bit lines and the column decoder. The column decoder is connected between the page buffer and data lines.

BRIEF DESCRIPTION OF THE DRAWINGS

FIG. 5 is a diagram illustrating an example of a plurality of key-value pair sets of a node.

FIG. 7 is a diagram illustrating an example of different lists of key-value pair sets.

DETAILED DESCRIPTION

Figure 1:
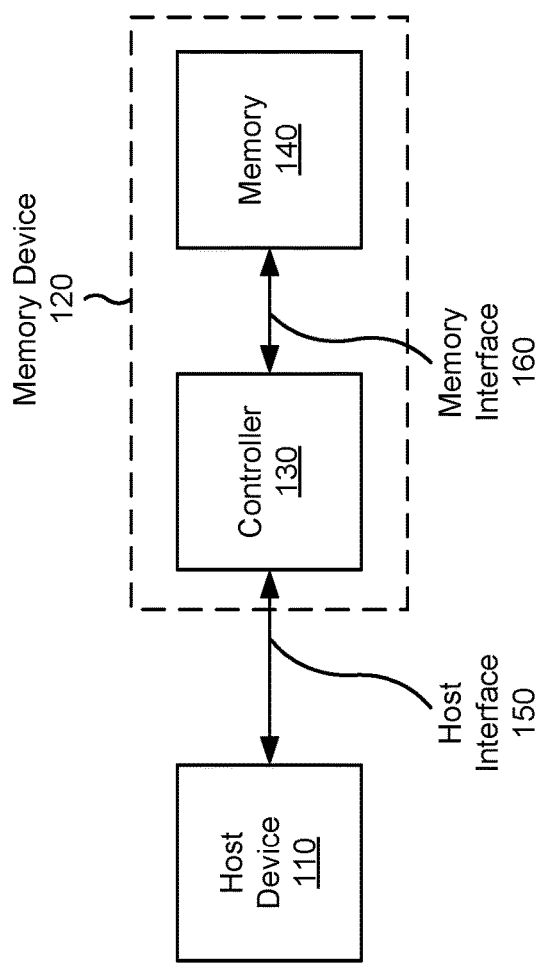
FIG. 1 is a diagram illustrating an example system capable of replacing key-value pair sets with new key-value pair sets.

A memory device may employ a key-value database, such as a log structured merge (LSM) key-value database, to store a plurality of key-value pair sets (kvsets). Each key-value pair set may include a plurality of key-value pairs. The LSM key-value database may employ a tree-like structure, in which a root node may be associated with a first level, and zero or more leaf nodes may be associated with a second level. The tree-like structure may include zero or more internal nodes. The root node may include zero or more key-value pair sets ordered by age. A leaf node may include zero or more key-value pair sets ordered by age. An internal node may include zero or more key-value pair sets ordered by age.

In the LSM key-value database, the memory device may rewrite the same key without deleting old versions of the key, which may cause the same key to appear in more than one key-value pair set. Old versions of the key may be considered garbage. A typical garbage collection operation, which may be performed by the memory device to remove the garbage, may involve rewriting all newer key-value pairs and not rewriting older key-value pairs (which may be considered as duplicate information or garbage). The newer key-value pairs may be rewritten in order to eliminate the garbage. The older key-value pairs may be discarded. However, this approach may involve a considerable amount of write amplification due to all of the newer key-value pairs being rewritten, which may increase the power consumption of the memory device and shorten the lifespan of the memory device.

Further, in the LSM key-value database, a key-value pair set in the root node may be spilled to only one leaf node. A root node may be a first level node, and a leaf node may be a second level node or a next level node. The memory device may determine, for each key in the key-value pair set, which leaf node should receive the key and the corresponding value. Each leaf node may be associated with an edge key, and a particular key in the key-value pair set may be directed to a particular leaf node based on the edge keys associated with that leaf node. The edge keys associated with that leaf node may be referred to as leaf node edge keys. Keys may be directed to leaf nodes based on the edge keys of two adjacent leaf nodes (the key has to be between those two edge keys). The memory device may read each key in the key-value pair set, and then rewrite each key and corresponding value to one of the leaf nodes. However, in some cases, an entire key-value pair set may be directed to the same leaf node, in which case reading and writing every key in the key-value pair set may increase the write amplification, which may increase the power consumption of the memory device and shorten the lifespan of the memory device.

In some implementations, the memory device may select a particular key-value pair set from a list of key-value pair sets. For example, the memory device may select the oldest key-value pair set, which may be likely to have the most garbage as compared to other key-value pair sets. The memory device may determine which keys are duplicate keys (or garbage) in the oldest key-value pair set, which may be based on the memory device looking at all keys in the list of key-value pair sets. The memory device may determine which keys are unique in the list of key-value pair sets, which may be based on the memory device looking at all keys in the list of key-value pair sets. A single key-value pair set may contain no duplicate keys, so "duplicate keys" may only apply to lists of key-value pair sets. The memory device may discard the duplicate keys and may only rewrite the remaining keys (e.g., the unique keys) from the oldest key-value pair set. The memory device may rewrite the remaining keys in a new key-value pair set, which may replace the oldest key-value pair set. The memory device may not modify other key-value pair sets in the list of key-value pair sets. As a result, the memory device may only need to rewrite unique data from the oldest key-value pair set, and may not need to rewrite unique data from the other key-value pair sets, thereby improving the write amplification for the memory device.

In some implementations, the memory device may determine when a plurality of keys (e.g., all keys) in a key-value pair set would otherwise be written to the same leaf node. The memory device may analyze the keys in the key-value pair set, and may determine a beginning key and an end key. For key-value pair sets, keys may already be sorted, so a first key and a last key may be identified. Given a set of keys, a scan may be performed to identify the beginning (smallest) and end (largest) keys. When the beginning key and the end key are associated with the same leaf node, which may be based on the edge key associated with that leaf node, the memory device may not read and rewrite every key in the key-value pair set. In other words, the memory device may not copy every key in the key-value pair set from the root node to the leaf node. Rather, the memory device may perform a renaming of the key-value pair set in the root node, such that the key-value pair set may become associated with the leaf node. The renaming of the key-value pair set may involve a metadata update for the key-value pair set, and may not involve copying the key-value pair set from the root node to the leaf node. As a result, the write amplification for the memory device may be reduced.

In some implementations, reducing the write amplification for the memory device may cause less wear and tear on the memory device, which may extend the lifespan of the memory device. Reducing the write amplification may also reduce power consumption for the memory device.

FIG. 1 is a diagram illustrating an example system 100 capable of replacing key-value pair sets with new key-value pair sets. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IOT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device or apparatus configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or an embedded multimedia card (eMMC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components. In some implementations, the controller 130 may be a high-level controller, which may communicate directly with the host device 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host device 110. As an example, a high-level controller may be an SSD controller, and a low-level controller may be a non-volatile memory controller (e.g., a NAND controller) or a volatile memory controller (e.g., a DRAM controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, the memory device 120 and/or the controller 130 may be configured to identify a list of key-value pair sets ordered by age; select a key-value pair set from the list of key-value pair sets, wherein the key-value pair set includes a plurality of key-value pairs, and wherein the key-value pair set selected from the list of key-value pair sets is an oldest key-value pair set in relation to other key-value pair sets in the list of key-value pair sets; identify, from the key-value pair set selected from the list of key-value pair sets, a first key that is included in at least one other key-value pair set from the list of key-value pair sets, wherein the first key is associated with a first value; identify, from the key-value pair set selected from the list of key-value pair sets, a second key that is not included in at least one other key-value pair set from the list of key-value pair sets, wherein the second key is associated with a second value; form a new key-value pair set that excludes the first key and the first value and includes the second key and the second value based on the first key being included in at least one other key-value pair set and the second key not being included in at least one other key-value pair set; and replace the key-value pair set selected from the list of key-value pair sets with the new key-value pair set.

In some implementations, the memory device 120 and/or the controller 130 may be configured to select a first list of key-value pair sets; select a second list of key-value pair sets, wherein key-value pair sets in the first list of key-value pair sets are newer than key-value pair sets in the second list of key-value pair sets; provide the first list of key-value pair sets and the second list of key-value pair sets to a merge loop process; obtain a first key-value pair and a second key-value pair from the merge loop process; form a new key-value pair set that excludes the first key-value pair and includes the second key-value pair in accordance with a set of rules; and replace the second list of key-value pair sets with the new key-value pair set.

In some implementations, the memory device 120 and/or the controller 130 may be configured to identify a list of key-value pair sets; determine, from the list of key-value pair sets, a key-value pair set, wherein the key-value pair set is an oldest key-value pair set in relation to other key-value pair sets in the list of key-value pair sets; identify, from the key-value pair set selected from the list of key-value pair sets, a first key that is included in at least one other key-value pair set from the list of key-value pair sets; identify, from the key-value pair set selected from the list of key-value pair sets, a second key that is not included in at least one other key-value pair set from the list of key-value pair sets; form a new key-value pair set that excludes the first key and includes the second key; and replace the key-value pair set selected from the list of key-value pair sets with the new key-value pair set.

In some implementations, the memory device 120 and/or the controller 130 may be configured to identify a plurality of key-value pair sets associated with a root node; determine that a plurality of keys in a key-value pair set, of the plurality of key-value pair sets, are associated with a leaf node in a plurality of leaf nodes based on an edge key associated with the leaf node; and associate the key-value pair set with the leaf node based on a renaming of the key-value pair set, wherein the key-value pair set becomes decoupled from the root node.

In some implementations, the memory device 120 and/or the controller 130 may be configured to identify a key-value pair set associated with a root node, wherein the key-value pair set includes a plurality of key-value pairs, and wherein the root node is associated with a log-structured merge-tree; determine that a plurality of keys in the key-value pair set are associated with a leaf node based on the plurality of keys corresponding to an edge key associated with the leaf node, wherein the leaf node is associated with the log-structured merge-tree; and associate the key-value pair set with the leaf node based on a metadata update of the key-value pair set, wherein the key-value pair set becomes decoupled from the root node.

In some implementations, the memory device 120 and/or the controller 130 may be configured to determine that a size of data in the memory satisfies a first threshold; write the data as a key-value pair set in a root node, wherein the root node is associated with a log-structured merge-tree; determine that a plurality of key-value pair sets in the root node satisfy a second threshold; determine, for each key-value pair set in the plurality of key-value pair sets, whether the key-value pair set satisfies a condition; and perform a first action or a second action involving the key-value pair set and one or more leaf nodes depending on whether the key-value pair set satisfies the condition, wherein the one or more leaf nodes are associated with the log-structured merge-tree.

As indicated above, FIG. 1 is provided as an example. Other examples may differ from what is described with regard to FIG. 1.

Figure 2:
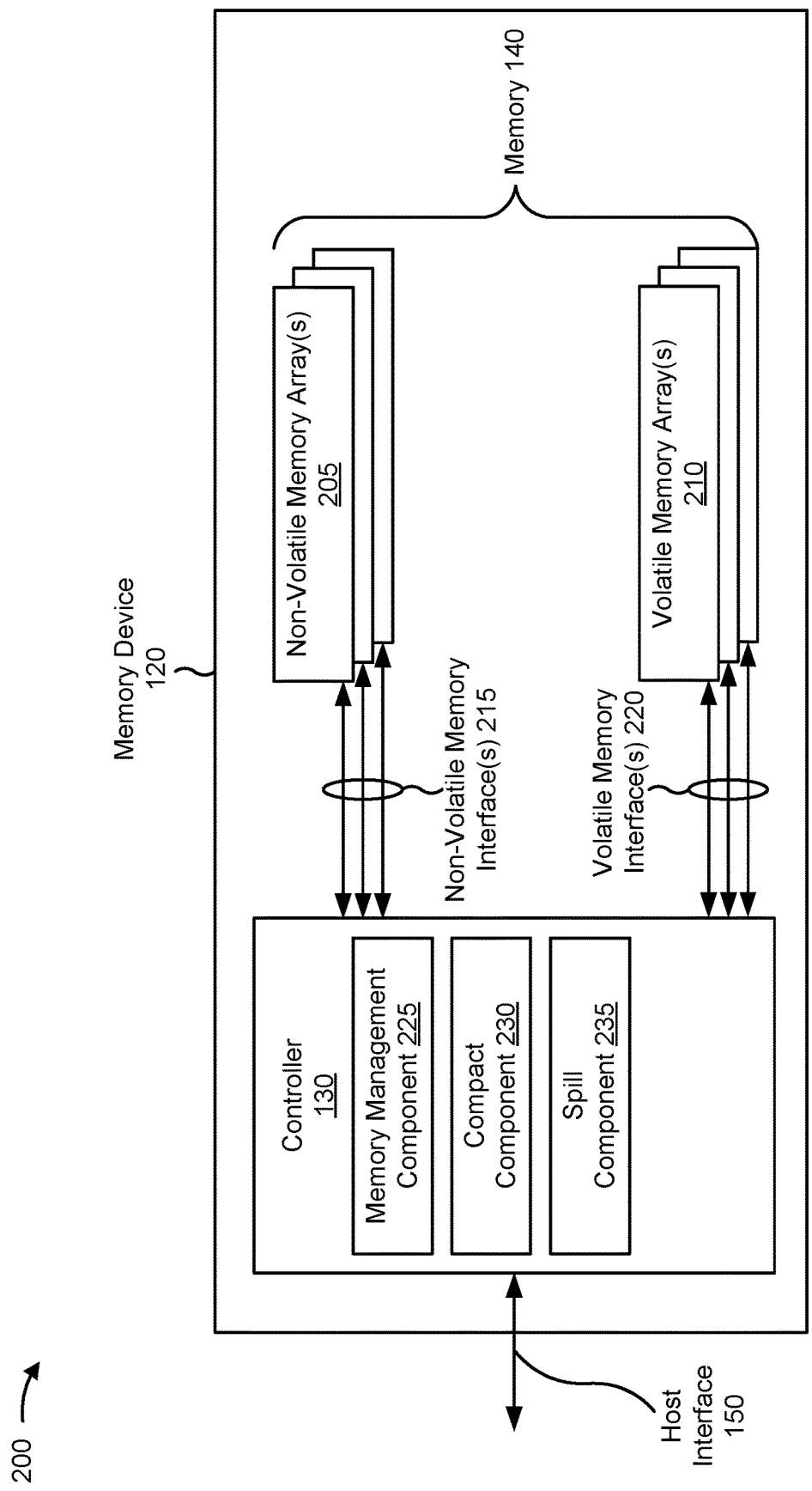
FIG. 2 is a diagram of example components included in a memory device.

FIG. 2 is a diagram of example components included in a memory device 120. As described above in connection with FIG. 1, the memory device 120 may include a controller 130 and memory 140. As shown in FIG. 2, the memory 140 may include one or more non-volatile memory arrays 205, such as one or more NAND memory arrays and/or one or more NOR memory arrays. Additionally, or alternatively, the memory 140 may include one or more volatile memory arrays 210, such as one or more SRAM arrays and/or one or more DRAM arrays. The controller 130 may transmit signals to and receive signals from a non-volatile memory array 205 using a non-volatile memory interface 215. The controller 130 may transmit signals to and receive signals from a volatile memory array 210 using a volatile memory interface 220.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 225, a compact component 230, and/or a spill component 235. In some implementations, one or more of these components are implemented as one or more instructions (e.g., firmware) executed by the controller 130. Alternatively, one or more of these components may be implemented as dedicated integrated circuits distinct from the controller 130.

The memory management component 225 may be configured to manage performance of the memory device 120. For example, the memory management component 225 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 225, such as information regarding memory block age, memory block erase count, and/or error information associated with a memory partition (e.g., a memory cell, a row of memory, a block of memory, or the like).

The compact component 230 may be configured to identify a list of key-value pair sets ordered by age; select a key-value pair set from the list of key-value pair sets, wherein the key-value pair set includes a plurality of key-value pairs, and wherein the key-value pair set selected from the list of key-value pair sets is an oldest key-value pair set in relation to other key-value pair sets in the list of key-value pair sets; identify, from the key-value pair set selected from the list of key-value pair sets, a first key that is included in at least one other key-value pair set from the list of key-value pair sets, wherein the first key is associated with a first value; identify, from the key-value pair set selected from the list of key-value pair sets, a second key that is not included in at least one other key-value pair set from the list of key-value pair sets, wherein the second key is associated with a second value; form a new key-value pair set that excludes the first key and the first value and includes the second key and the second value based on the first key being included in at least one other key-value pair set and the second key not being included in at least one other key-value pair set; and replace the key-value pair set selected from the list of key-value pair sets with the new key-value pair set.

The compact component 230 may be configured to select a first list of key-value pair sets; select a second list of key-value pair sets, wherein key-value pair sets in the first list of key-value pair sets are newer than key-value pair sets in the second list of key-value pair sets; provide the first list of key-value pair sets and the second list of key-value pair sets to a merge loop process; obtain a first key-value pair and a second key-value pair from the merge loop process; form a new key-value pair set that excludes the first key-value pair and includes the second key-value pair in accordance with a set of rules; and replace the second list of key-value pair sets with the new key-value pair set.

The compact component 230 may be configured to identify a list of key-value pair sets; determine, from the list of key-value pair sets, a key-value pair set, wherein the key-value pair set is an oldest key-value pair set in relation to other key-value pair sets in the list of key-value pair sets; identify, from the key-value pair set selected from the list of key-value pair sets, a first key that is included in at least one other key-value pair set from the list of key-value pair sets; identify, from the key-value pair set selected from the list of key-value pair sets, a second key that is not included in at least one other key-value pair set from the list of key-value pair sets; form a new key-value pair set that excludes the first key and includes the second key; and replace the key-value pair set selected from the list of key-value pair sets with the new key-value pair set.

The spill component 235 may be configured to identify a plurality of key-value pair sets associated with a root node; determine that a plurality of keys in a key-value pair set, of the plurality of key-value pair sets, are associated with a leaf node in a plurality of leaf nodes based on an edge key associated with the leaf node; and associate the key-value pair set with the leaf node based on a renaming of the key-value pair set, wherein the key-value pair set becomes decoupled from the root node.

The spill component 235 may be configured to identify a key-value pair set associated with a root node, wherein the key-value pair set includes a plurality of key-value pairs, and wherein the root node is associated with a log-structured merge-tree; determine that a plurality of keys in the key-value pair set are associated with a leaf node based on the plurality of keys corresponding to an edge key associated with the leaf node, wherein the leaf node is associated with the log-structured merge-tree; and associate the key-value pair set with the leaf node based on a metadata update of the key-value pair set, wherein the key-value pair set becomes decoupled from the root node.

The spill component 235 may be configured to determine that a size of data in the memory satisfies a first threshold; write the data as a key-value pair set in a root node, wherein the root node is associated with a log-structured merge-tree; determine that a plurality of key-value pair sets in the root node satisfy a second threshold; determine, for each key-value pair set in the plurality of key-value pair sets, whether the key-value pair set satisfies a condition; and perform a first action or a second action involving the key-value pair set and one or more leaf nodes depending on whether the key-value pair set satisfies the condition, wherein the one or more leaf nodes are associated with the log-structured merge-tree.

One or more devices or components shown in FIG. 2 may be configured to perform operations described elsewhere herein, such as one or more operations and/or methods described in connection with FIGS. 3-12. For example, the controller 130, the memory management component 225, the compact component 230, and/or the spill component 235 may be configured to perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
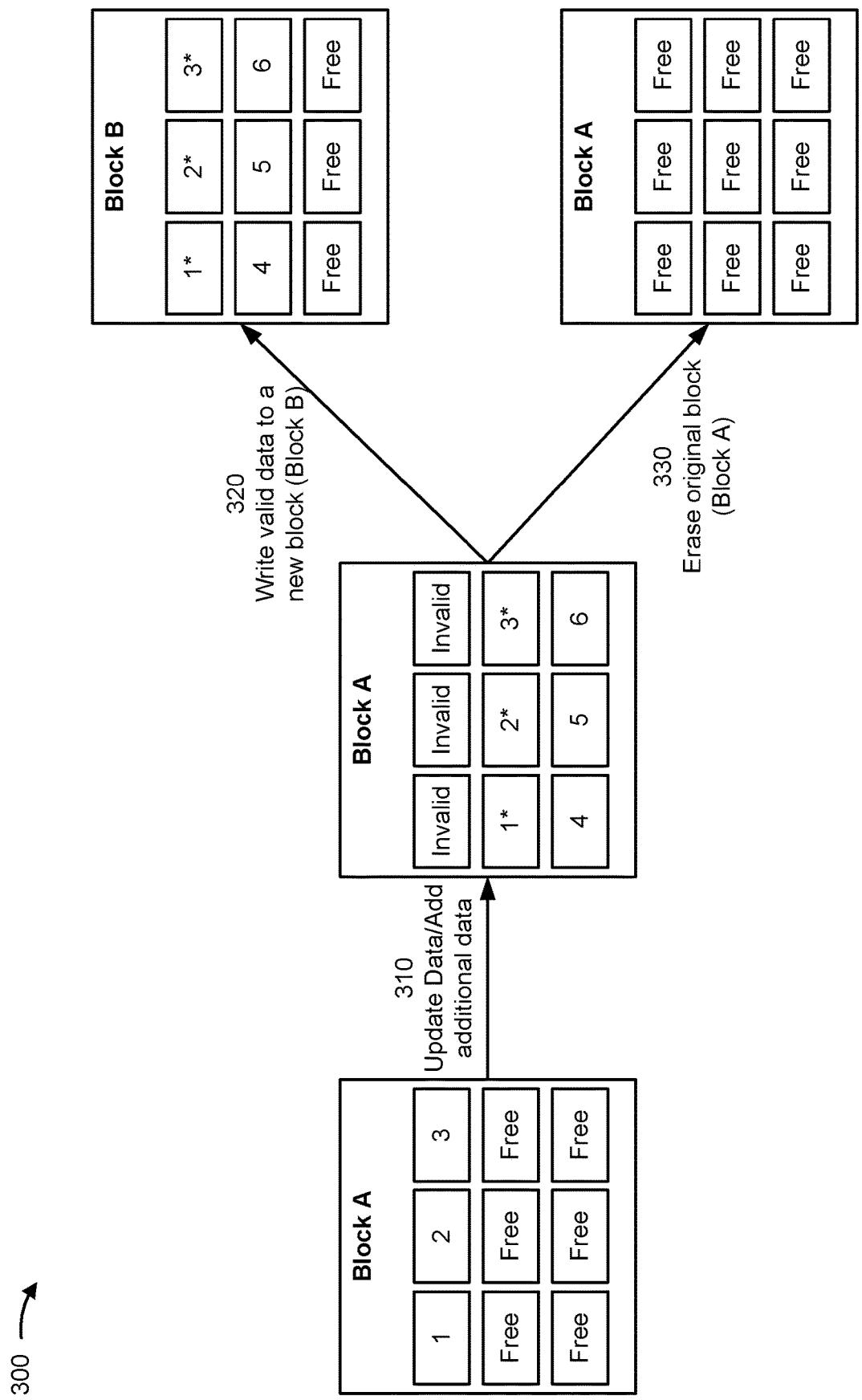
FIG. 3 is a diagram illustrating an example of a garbage collection operation.

FIG. 3 is a diagram illustrating an example 300 of a garbage collection operation. Garbage collection may be a function or operation of the memory device 120 associated with reclaiming memory that is no longer in use. For example, the memory device 120 (e.g., the controller 130) may perform one or more operations described herein to reclaim memory which was previously allocated by the memory device 120, but is no longer referenced or valid.

For example, as shown in FIG. 3, a block (e.g., block A) may be associated with a set of pages. As shown, one or more pages of the block A may be associated with valid data (e.g., shown as page 1, page 2, and page 3). Other pages of the block A may not have data written to them and/or may be free (e.g., shown as "free" in FIG. 3). In a first operation 310, the memory device may update data (e.g., re-write data) that is stored by the block A and/or may write new (or additional) data to the block A. For example, the memory device 120 may re-write the data stored in page 1, page 2, and page 3 to different pages of the Block A (e.g., shown as page 1*, page 2*, and page 3* in FIG. 3). The memory device 120 may mark the pages that previously stored the now re-written data as invalid. For example, erase operations may be performed at the block level (e.g., individual pages may not be erased), therefore, when data is re-written or updated, the pages that store the now stale data may be marked as invalid by the memory device 120. Additionally, the memory device 120 may receive additional data (e.g., from the host device 110) to be written. The memory device 120 may write the additional data to other pages of the block A (e.g., shown as page 4, page 5, and page 6).

As shown in FIG. 3, after the re-writing of previously stored data and/or the writing of additional data to the block A, all pages of the block A may store data (e.g., the block A may be full). However, some pages of the block A may store stale or invalid data. Therefore, the memory device 120 may perform a garbage collection operation to reclaim memory which is allocated to stale or invalid data and to preserve the valid data stored by the block A. In some implementations, a given block may be associated with a valid page count or a valid TU count indicating a quantity of pages of the given block that store valid data. In some implementations, the memory device 120 may select a block (e.g., the block A) to be associated with the garbage collection operation based on the valid page count or the valid TU count of the block satisfying a threshold. As another example, the memory device 120 may select a block (e.g., the block A) to be associated with the garbage collection operation based on the block being associated with the most invalid pages or the lowest valid page count or valid TU count among a set of blocks.

In a second operation 320, the memory device 120 may write valid data stored in the block A to a different block (e.g., block B). For example, as shown in FIG. 3, the data stored by the page 1*, page 2*, and page 3*, page 4, page 5, and page 6 of the block A may be written to, or folded to, respective pages of the block B (e.g., this may referred to as a garbage collection write operation or a folding write operation). In such examples, the block A may be referred to as a victim block for the garbage collection operation. The memory device 120 may update an address (e.g., a logical block address (LBA)) of the data that is written to the block B (e.g., indicating an updated physical location where the data is stored).

In a third operation 330, the memory device 120 may perform an erase operation to erase data stored by the block A (e.g., after writing or folding the valid data to the block B). As a result, the block A may be erased, and all pages of the block A may be available to be written. This may enable the memory device to reclaim memory that was previously used to store stale or invalid data and to preserve valid data stored by the memory device 120. This may improve a performance of the memory device 120 and/or may increase a lifespan of the memory device 120.

As indicated above, FIG. 3 is provided as an example. Other examples may differ from what is described with regard to FIG. 3.

A key-value database may be a collection of key-value pairs stored in memory. A key-value pair set (kvset) may include a plurality of key-value pairs. The key-value pair set may also be referred to as a bucket. The key-value database may include a plurality of key-value pair sets (kvsets). A given key may correspond to a certain value. For example, a key may be an employee identifier, and a corresponding value may be an employee address. One example of a key-value database is a heterogeneous memory storage engine (HSE). The key-value database may be an LSM key-value database, which may use an LSM tree to store key-value pairs. The LSM tree may be used to store a plurality of key-value pair sets, where each key-value pair set may include a plurality of key-value pairs. LSM may refer to a design pattern for the key-value database. LSM may contrast with other design patterns for key-value databases, such as an update-in-place. Updates may be applied differently for LSM key-value databases versus update-in-place key-value databases. An update may involve a new key with a value. The update may involve an update to an existing key (presumably with a new value). The update may involve deleting an existing key.

In an update-in-place approach (e.g., non-LSM), the update-in-place key-value database may have a single copy of each key-value pair. Updates may involve finding an existing entry and updating that entry (e.g., update-in-place). In an LSM approach, the LSM key-value database may have multiple copies of a key. The newest copy of the key may be present, which may correspond to the one copy of the key in the update-in-place approach. In the LSM approach, updates may be added to the LSM key-value database without deleting old copies of the key. In the LSM approach, a particular entry may not be found and updated. Rather, in the LSM approach, new entries are added without old entries being immediately deleted.

In the LSM approach, when data is written (old data) and then the same data (new data) is later written to the LSM key-value database, the new data does not overwrite the old data in the LSM key-value database. Rather, the LSM key-value database creates a new copy of the data. After a period of time, multiple copies of the same data may be stored on the LSM key-value database. Old copies of the same data may be referred to as garbage.

When comparing the LSM approach with the update-in-place approach, LSM may create garbage (e.g. old copies of keys), which may not occur with the update-in-place approach. LSM updates may involve less work than update-in-place updates because the LSM updates may not involve delete operations. LSM queries may be more work than update-in-place queries because LSM queries may involve finding the newest key among multiple copies of keys. In the update-in-place approach, only one unique key may be present.

In an LSM key-value database, in order to resolve or remove old copies of the same data (or garbage), a memory device (or a controller of the memory device) may perform a garbage collection. The memory device may determine which data is garbage and which data should be kept. As an example, the memory device may identify a key-value pair set (or bucket) with 10 gigabytes (GB) of data. The 10 GB of data may include 1 GB of good data (e.g., non-duplicate data), and 9 GB of duplicate data (or garbage). The memory device may perform the garbage collection to eliminate the 9 GB of duplicate data and keep the 1 GB of good data. In a typical approach for garbage collection, the memory device may rewrite all the good data. The memory device may analyze all 10 GB of data, sort the 10 GB of data, and then rewrite the 1 GB of good data. The memory device may rewrite the 1 GB of good data as a new key-value pair set that contains no duplicate data. As another example, a key-value pair set with 10 GB of data may include 7 GB of good data and 3 GB of duplicate data, where the good data and the duplicate data may be intermixed within the key-value pair set. After sorting data in the key-value pair set, the memory device may rewrite the 7 GB of good data to eliminate the 3 GB of duplicate data. The memory device may rewrite the 7 GB of good data as a new key-value pair set that contains no duplicate data.

In an LSM key-value database, the amount of stored data may grow over time because old data is not overwritten as new data is added. Over the period of time, the LSM key-value database may form a chain of key-value pair sets, where a right end of the chain may be associated with the oldest data, and a left end of the chain may be associated with the newest data that has been written. In the LSM key-value database, existing data may not be rewritten. Rather, a new key-value pair set may be created, and new data may be inserted into the new key-value pair set. When a number of key-value pair sets satisfies a threshold, a garbage collection may be performed to free data in memory. The existing data may not be rewritten, but may be read, in order to optimize a NAND program-erase cycle of the memory device.

In an LSM key-value database, in a typical approach for garbage collection, the memory device may gather all or nearly all key-value pair sets (or buckets) in a node. The node may be a root node or a leaf node, and the node may be associated with a plurality of key-value pair sets. The memory device may rewrite all unique keys and corresponding values to produce a new key-value pair set which contains no duplicate data (e.g., no garbage). However, this typical approach for garbage collection may involve a considerable amount of write amplification (or write amp). When data is initially written to the LSM key-value database, the write amplification is one (e.g., no amplification). During a maintenance or garbage collection, if the data is rewritten to the LSM key-value database three times, the write amplification is three. Each time the data is compacted, the data may be rewritten to the LSM key-value database. Over a period of time, rewriting the same data many times (e.g., hundreds of times) may add wear and tear to the memory device, which may potentially shorten the life of the memory device. An update-in-place key-value database (e.g., a traditional file system) may not suffer from this problem because when data is written, the data may not be rewritten or compacted, so the write amplification is one.

A database workload may continuously cycle through a plurality of nodes (e.g., a root node and/or a leaf node), and may update every key in each of the plurality of nodes. The database workload may continually rewrite the keys (e.g., all keys) in the LSM key-value database. The database workload may update key 0 to key N, and then may repeat this process. After a first pass, approximately 15 GB of data may be in each node. After the first pass, one copy of each key may be stored. After a second pass, the size of each node may double to approximately 30 GB, of which approximately half may be duplicate data (or garbage). After the second pass, two copies of each key may be stored. With each pass, copies of the keys may be accumulated, where only a most recently written key should be kept, and older written keys should be deleted. During the second pass, the write amplification may be high enough to trigger a garbage collection. At that point, the garbage collection may effectively follow the database workload and clean duplicate data written based on the database workload. Due to the garbage collection, 15 GB may be rewritten in each node to eliminate the 15 GB of duplicate data. In some cases, the data rewritten due to the garbage collection may be relatively new (or relatively young).

A typical approach to garbage collection may involve two types of compaction. A key compaction (k-compact) may involve a compaction of only keys and does not involve values. During the key compaction, a plurality of key-value pair sets may be analyzed, and duplicate keys may be eliminated. A key-value pair set may be rewritten, but may only involve a rewrite of keys (e.g., no rewrite of values). Keys in a newer key-value pair set may be detected as being newer than keys in an older key-value pair set, so those keys may be discarded. Corresponding values may not be discarded, so those values are still stored but are no longer referenced. The key compaction may result in fewer keys, which may be helpful during a key lookup. Since the key compaction does not eliminate values, the key compaction does not remove any garbage. The values may still be stored in memory and may no longer be referenced (e.g., the values does not become reclaimed). A key-value compaction (kv-compact) may involve a compaction of both keys and values. During the key-value compaction, the values may be written to remove duplicate values (or garbage). The key compaction and the key-value compaction may involve multiple key-value pair sets because two or more key-value pair sets may be combined into one key-value pair set.

A key-value pair set may include header blocks, key blocks, and value blocks. The header blocks may be associated with metadata. The key blocks may be associated with keys. The keys may be sorted by age. The value blocks may be associated with values. During the key compaction, header blocks and the key blocks may be rewritten. During the key-value compaction, the header blocks, the key blocks, and the value blocks may be rewritten.

In some implementations, the memory device may determine that an oldest key-value pair set, in a list of key-value pair sets ordered by age, is most likely to contain the most duplicate keys and corresponding values. The list of key-value pair sets may refer to a contiguous set of key-value pair sets ordered by age. As compactions are performed over a period of time, the oldest key-value pair set may be likely to have the most duplicate keys due to the compactions. Based on this assumption, instead of gathering the key-value pair sets and determining which keys are good and then replacing the key-value pair sets with one key-value pair set of good keys, the memory device may leave the key-value pair sets as is. The memory device may replace only the oldest key-value pair set (e.g., the last key-value pair set in the list of key-value pair sets, which corresponds to the oldest key-value pair set), which may be likely to have the most duplicate keys within the list of key-value pair sets. The memory device may analyze all of the key-value pair sets and determine which keys are good (e.g., which keys are non-duplicate keys). The memory device may keep the good keys and corresponding values in the oldest key-value pair set. The memory device may only rewrite the good keys and corresponding values in the oldest key-value pair set. In order to determine which keys are duplicate, the memory device may read every key in the oldest key-value pair set. The memory device may not read values associated with the keys in the oldest key-value pair set. The memory device may perform a special query to determine whether a newer key exists in an earlier key-value pair set. The memory device may ensure that an older key has a sequence number that is safe to delete. The memory device may not necessarily read the keys in every key-value pair set, but rather may only read the keys in the oldest key-value pair set, which may reduce a read amplification (or read amp) for the memory device. Reducing the read amplification may cause less wear and tear for the memory device.

In some implementations, the memory device may create a new key-value pair set with only the good keys and corresponding values from the oldest key-value pair set, and then the memory device may delete the oldest key-value pair set. In other words, the new key-value pair set may replace the oldest key-value pair set. The memory device may perform no action on the other key-value pair sets in the list of key-value pair sets. As a result, the memory device may eliminate a majority of the duplicate keys, but may only have to write a relatively small amount of data to achieve the majority of the duplicate keys being eliminated. The memory device may minimize the amount of data to be rewritten in order to maximize the amount of garbage collection. Rewriting less data may result in less wear and tear of the memory device, as well as save power.

In some implementations, a key-value pair set may include a plurality of keys and corresponding values. The values may be addressed using the keys. Within the key-value pair set, a value may be associated with a unique key. When the same key appears in more than one key-value pair set, only the newest (or youngest) key may be good, and the other keys may be duplicate keys (or garbage). The same key may be in different key-value pair sets because the key may be generated at different times. An oldest key-value pair set may generally have the most duplicate keys due to the nature of garbage collection, but in some cases, a less old key-value pair set may have more duplicate keys than the oldest key-value pair set.

In some implementations, the memory device may look at the oldest key-value pair set. The memory device may sort all of the keys in the list of key-value pair sets, but the memory device may only rewrite keys that appear in the oldest key-value pair set. The memory device may only rewrite keys for which there is no newer (or younger) key in any of the other key-value pair sets in the list of key-value pair sets. The memory device may look at the keys in the list of key-value pair sets and sort the keys by age. The memory device may only keep the newest (or youngest) keys. When a key is left from the oldest key-value pair set, then no newer key may be available for this key and the key may be kept. For keys in the oldest key-value pair set that appear in different key-value pair sets (e.g., newer key-value pair sets), such keys may be discarded. In other words, the memory device may only keep keys from the oldest key-value pair set when there is no newer version of that key in any other key-value pair set in the list of key-value pair sets. When a newer key is in the oldest key-value pair set, but an older version of that key is in some other key-value pair set, the newer key may be discarded. The memory device may determine which keys to keep from the oldest key-value pair set and which keys to discard from the oldest key-value pair set, and for the keys that are to be kept, the memory device may write these keys and corresponding values into a new key-value pair set. In other words, the memory device may create the new key-value pair set, which may then replace the oldest key-value pair set.

In some implementations, repeated key compactions may result in the oldest key-value pair set containing the oldest keys, and typically the most duplicate keys (or garbage) as compared to newer key-value pair sets. The memory device may employ rewriting only the oldest key-value pair set in order to minimize the amount of data that needs to be rewritten. Such a compaction approach may be referred to as a zero (or near-zero) write amplification compaction (z-compaction). In such an approach, the memory device may build the new key-value pair set to only contain the keys and values from the oldest key-value pair set that are unique relative to other key-value pair sets (e.g., input key-value pair sets). The new key-value pair set may directly replace the oldest key-value pair set, and keys and values in other key-value pair sets may remain at rest. In the case of the database workload, a resulting key-value pair set may typically be empty, which may result in a zero write amplification garbage collection operation. Further, when installing the new key-value pair set (to replace the oldest key-value pair set), its compaction may be acquired from a predecessor key-value pair set so that the new key-value pair set may partake in a next key compaction, and allow for repeated application of z-compaction.

In some implementations, the memory device may use a log (e.g., a hyper-log-log), which may indicate a number of unique keys in a list of key-value pair sets. The number of unique keys in a particular list of key-value pair sets may indicate an amount of garbage in that list of key-value pair sets, and the memory device may use such information when selecting which key-value pair set is to be replaced with the newer key-value pair set. In other words, the memory device may not necessarily select the oldest key-value pair set, but rather the key-value pair set with the most garbage, as determined using information from the log. In some implementations, the memory device may use the log to compute an amount of garbage in a last key-value pair set relative to other key-value pair sets. When the amount of garbage in the last key-value pair set is relatively high (e.g., satisfies a threshold of 90%), the memory device may employ the z-compaction to minimize the amount of data that needs to be rewritten. By minimizing the amount of data that is rewritten, the z-compaction may reduce wear and tear on the memory device, thereby extending a life of the memory device. When the amount of garbage in key-value pair sets is relatively low, the memory device may determine to not employ the z-compaction, and rather may revert to a prior approach (e.g., writing all data to remove garbage). In some implementations, each key-value pair set may be associated with a log. The memory device may perform union operations between logs associated with any two key-value pair sets or between any X key-value pair sets. An overlap between the key-value pair sets may be an indication of garbage, and the memory device may use such information to determine which key-value pair sets should be replaced.

In some implementations, the memory device may determine various metrics of a node, such as ages of key-value pair sets in the node, sizes of key-value pair sets in the node, and/or a number of value groups associated with the node. Given sufficient key compactions, an analysis of the node using such metrics may result in an application of the z-compaction. In some implementations, each key and key-value compact attempt may involve analyzing the list of key-value pair sets. When oldest key-value pair sets contain duplicate keys, then all of the oldest key-value pair sets may be dropped. For a key compaction of four key-value pair sets, each with the same set of overlapping keys, the key compaction may involve dropping the oldest key-value pair sets and may not involve rewriting the newest key-value pair set.

In some implementations, the memory device may consider prefix deletes, which may potentially erase a number of key-value pairs in a key-value pair set. A prefix delete may be inserted into the key-value pair set. The prefix delete may involve a partial match for keys in that key-value pair set, but may not be a key itself. The prefix delete may be a prefix (or tombstone), such that any key that matches that prefix may be deleted from the key-value pair set. For example, the key-value pair set may include a first group of keys that each start with ABC, a second group of keys that each start with 123, and a third group of keys that each start with 456. When a prefix delete for 123 is inserted in the key-value pair set, this prefix delete may delete every key in the key-value pair set that starts with 123, but may not delete any of the other keys in the key-value pair set. In some implementations, the memory device may accommodate prefix deletes when implementing the z-compaction. A particular prefix delete in the key-value pair set may not match any keys in the key-value pair set, in which case the prefix delete does not cause any keys in the key-value pair set to be deleted. The prefix delete may eventually be moved to the oldest key-value pair set, at which point the memory device may remove the prefix delete during the z-compaction. For example, the memory device may identify the prefix delete in the oldest key-value pair set and determine whether the prefix delete matches any keys, and if not, the memory device may delete the prefix key. The new key-value pair set that is formed may not have this prefix key.

Figure 4:
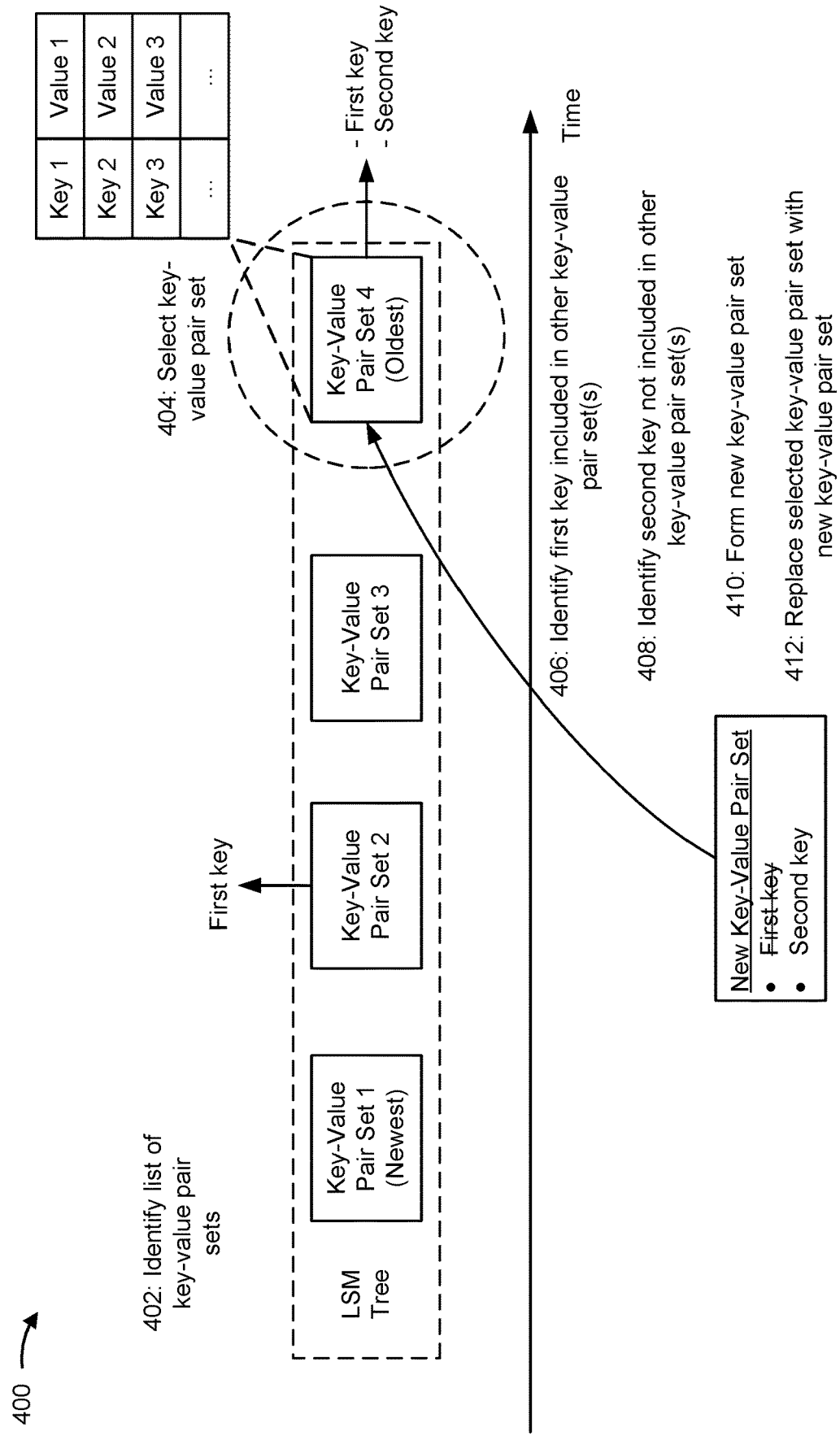
FIG. 4 is a diagram illustrating an example of replacing key-value pair sets with new key-value pair sets.

FIG. 4 is a diagram of an example 400 of replacing key-value pair sets with new key-value pair sets. The operations described in connection with FIG. 4 may be performed by the memory device 120 and/or one or more components of the memory device 120, such as the controller 130 and/or one or more components of the controller 130.

In some implementations, the memory device 120 may perform a garbage collection on a list of key-value pair sets to remove duplicate keys (or garbage) stored in the list of key-value pair sets. For example, the same key may be stored in multiple key-value pair sets in the list of key-value pair sets. A newer version of the key may be needed, but older versions of the key may be duplicate versions and considered to be garbage. The memory device 120 may perform the garbage collection in accordance with a predefined schedule, or based on an amount of garbage satisfying a threshold.

As shown by reference number 402, during the garbage collection, the memory device 120 may identify the list of key-value pair sets ordered by age. For example, the list of key-value pair sets may include a first key-value pair set (a newest key-value pair set), a second key-value pair set, a third key-value pair set, and a fourth key-value pair set (an oldest key-value pair set). Each key-value pair set may include a plurality of key-value pairs. The list of key-value pair sets may be associated with an LSM tree. The LSM tree may be part of an LSM key-value database.

As shown by reference number 404, the memory device 120 may select a key-value pair set (e.g., the fourth key-value pair set) from the list of key-value pair sets. The key-value pair set may include a plurality of key-value pairs. The memory device 120 may select the key-value pair set based on a predefined rule. For example, the key-value pair set may be the oldest key-value pair set in relation to other key-value pair sets in the list of key-value pair sets. The memory device 120 may select the oldest key-value pair set based on the predefined rule indicating that oldest key-value pair sets are most likely to have the most duplicate keys (or garbage) in relation to other key-value pair sets.

In some implementations, the memory device 120 may select the key-value pair set based on an age associated with the key-value pair set, and/or a size associated with the key-value pair set (e.g., a relatively large size may be indicative of garbage). In some implementations, the memory device 120 may select the key-value pair set from the list of key-value pair sets based on a number of unique keys in the key-value pair set in relation to numbers of unique keys in other key-value pair sets from the list of key-value pair sets. A key-value pair set with fewer unique keys, as compared to other key-value pair sets, may be indicative that the key-value pair set contains duplicate keys. The memory device 120 may select the key-value pair set that is likely to have the most duplicate keys as compared to other key-value pair sets in the list of key-value pair sets.

As shown by reference number 406, the memory device 120 may identify, from the key-value pair set selected from the list of key-value pair sets, a first key. The first key may be included in at least one other key-value pair set from the list of key-value pair sets. The first key is associated with a first value. For example, the first key may be included in both the fourth key-value pair set and the second key-value pair set, which may indicate that the first key in the fourth key-value pair set may be older than the first key in the second key-value pair set. The memory device 120 may read a plurality of keys (e.g., all keys) in the list of key-value pair sets in order to determine whether the first key is included in other key-value pair sets in the list of key-value pair sets.

As shown by reference number 408, the memory device 120 may identify, from the key-value pair set selected from the list of key-value pair sets, a second key. The second key may not be included in at least one other key-value pair set from the list of key-value pair sets. The second key may be associated with a second value. For example, the second key may only be included in the fourth key-value pair set. The memory device 120 may read the plurality of keys (e.g., all keys) in the list of key-value pair sets in order to determine whether the second key is included in other key-value pair sets in the list of key-value pair sets.

As shown by reference number 410, the memory device 120 may form a new key-value pair set that does not include the first key and the first value and does include the second key and the second value based on the first key being included in at least one other key-value pair set and the second key not being included in at least one other key-value pair set. The new key-value pair set may exclude the first key and the first value and may include the second key and the second value based on the first key being included in at least one other key-value pair set and the second key not being included in at least one other key-value pair set. The first key in the key-value pair set that is included in at least one other key-value pair set may be a duplicate key that is able to be discarded when forming the new key-value pair set. The second key in the key-value pair set that is not included in at least one other key-value pair set may be kept when forming the new key-value pair set.

As shown by reference number 412, the memory device 120 may replace the key-value pair set selected from the list of key-value pair sets with the new key-value pair set. The new key-value pair set may include the second key, but may not include the first key. The other key-value pair sets from the list of key-value pair sets may not be replaced with newer key-value pair sets. In other words, the memory device 120 may not perform any modifications to the other key-value pair sets (e.g., the first, second, and third key-value pair sets), which may be based on an assumption that the other key-value pair sets have minimal to no duplicate keys.

In some implementations, the memory device 120 may identify, from the key-value pair set selected from the list of key-value pair sets, a prefix associated with a prefix delete. The prefix delete may have been inserted into the key-value pair set. The memory device 120 may form the new key-value pair set to not include the prefix based on no key in at least one other key-value pair set matching the prefix. In other words, the memory device 120 may consider or account for the prefix delete when forming the new key-value pair set.

As indicated above, FIG. 4 is provided as an example. Other examples may differ from what is described with regard to FIG. 4.

FIG. 5 is a diagram of an example 500 of a plurality of key-value pair sets of a node. The operations described in connection with FIG. 5 may be performed by the memory device 120 and/or one or more components of the memory device 120, such as the controller 130 and/or one or more components of the controller 130.

As shown in FIG. 5, 8 key-value pair sets in a node (e.g., node 3) may be defined. Each key-value pair set may be represented by "k", and the node may be represented by "n". The node may essentially be a bucket of buckets. Each key-value pair set and the node may be associated with an identifier (IDX). For example, IDX 8 may correspond to key-value pair set 8. Key-value pair set may be the last key-value pair set in the node, which may indicate that key-value pair set 8 is the oldest key-value pair set in the node. Key-value pair set 0 may be the newest (or youngest) key-value pair set in the node. The newer key-value pair sets may have fewer keys as compared to older key-value pair sets, which may be due to key-compaction. About three or four newer key-value pair sets may be key-compacted at the same time. VGRP may indicate the number of times a particular key-value pair set has been compacted. For example, a VGRP of four may indicate that a corresponding key-value pair set has been derived from four different key-value pair sets. A key-compaction involving key-value pair set 0, key-value pair set 1, and key-value pair set 2 may result in a new key-value pair set having a VGRP of three. Those three key-value pair set may be replaced by a new key-value pair set that contains all of the keys from the previous key-value pair sets.

In some implementations, compact operations may be repeated, and each time a key-value pair set is compacted, a COMP associated with the key-value pair set is increased by one. Newer key-value pair sets may not be compacted, so the COMP corresponding to the newer key-value pair sets may be zero. In this example, key-value pair set 8 has been compacted 65 times. The node may be associated with approximately 31 million keys, and key-value pair set 8 may be associated with nearly half of the 31 million keys. If the amount of garbage is relatively high in this node, then key-value pair sets 0 through 7 likely have newer keys that also exist in key-value pair set 8. As a result, key-value pair set 8 may be removed or z-compacted without processing key-value pair sets 0 through 7, which would remove much of the garbage in the node by only processing key-value pair set 8. In an old approach, all of key-value pair sets 0 through 8 would be obtained, the newer keys would be rewritten, and the older keys would be discarded, which would result in a new key-value pair set. However, this old approach would involve a considerable amount of write amplification. In some implementations, each key-value pair set may be associated with an h-length (or metadata length) (HLEN), a key length (KLEN), and a value length (VLEN). Key-value pair set 8 may be associated with approximately 17 GB, which may be discarded or z-compacted, and the 15 to 16 GB in key-value pair sets 0 through 7 may not be rewritten. Further, each key-value pair set may be associated with a number of h-blocks (HBLK), key blocks (KBLK), and value blocks (VBLK).

In some implementations, the node may contain approximately 16.7 million unique keys. A majority of keys in key-value pair set may be discarded by a z-compaction. When a memory device performs the z-compaction by reading all keys in all key-value pair sets may only recreates the last key-value pair set (if needed), the last key-value pair set may effectively be eliminated without having to rewrite all the data in the other key-value pair sets. The memory device may analyze the node to determine whether to apply the z-compaction, or a key compaction or a key-value compaction. The memory device may determine to apply the z-compaction based on the number of unique keys in the oldest key-value pair set being approximately the same as the number of unique keys in the node itself.

As indicated above, FIG. 5 is provided as an example. Other examples may differ from what is described with regard to FIG. 5.

In an existing key-value compaction, a memory device may identify a list of input key-value pair sets. The memory device may feed the input key-value pair sets into a merge loop process. For each key-value pair that is outputted from the merge loop process, the memory device may either write the key-value pair to an output key-value pair set or discard the key-value pair. When all key-value pairs from the input key-value pair sets are processed by the merge loop process (e.g., either discarded or written to the output key-value pair set), a new key-value pair set may be formed. The new key-value pair set may correspond to the output key-value pair set. The new key-value pair set may replace the input key-value pair sets, and the input key-value pair sets may be deleted.

In some implementations, in the z-compaction, the memory device may identify two lists of input key-value pair sets. A first list of key-value pair sets may be a list of untouchable key-value pair sets. A second list of key-value pair sets may be a list of duplicate (or garbage) key-value pair sets. The first list of key-value pair sets may be newer than the second list of key-value pair sets. The first list of key-value pair sets and the second list of key-value pair sets may both be fed into the merge loop process. For each key-value pair that is outputted from the merge process, the memory device may perform one of three options. In a first option, when the key-value pair is able to be discarded, the memory device may discard the key-value pair. In a second option, when the key-value pair should be kept and is from the first list of key-value pair sets, the memory device may discard the key-value pair. In a third option, when the key-value pair should be kept and is from the second list of key-value pair sets, the memory device may write the key-value pair to an output key-value pair set. When all key-value pairs from the input key-value pair sets are processed by the merge loop process (e.g., either discarded or written to the output key-value pair set), a new key-value pair set may be formed. The new key-value pair set may correspond to the output key-value pair set. The new key-value pair set may replace the second list of key-value pair sets, and the second list of key-value pair sets may be deleted. The first list of key-value pair sets may remain in place.

In some implementations, when the first list of key-value pair sets is empty (e.g., no untouchable key-value pair sets are defined), the memory device may perform the z-compaction by looking at the oldest key-value pair set. The second list of key-value pair sets may be any subsequence of a node's key-value pair sets (e.g., key-value pair sets of a root node or a leaf node), and the second list of key-value pair sets may not necessarily include the oldest key-value pair set. The first list of key-value pair sets may include any key-value pair set, as long as the key-value pair set is newer than a newest key-value pair set in the second list of key-value pair sets. The first list of key-value pair sets may be ordered by age. The first list of key-value pair sets may not necessarily be a proper subsequence of the node's key-value pair sets. For example, the first list of key-value pair sets may correspond to a sparse subsequence of the node's key-value pair sets. The first list of key-value pair sets may include key-value pair sets from the root node. The first list of key-value pair sets may include a plurality of key-value pair sets of the root node (e.g., all key-value pair sets of the root node) and a plurality of key-value pair sets of a leaf node (e.g., all key-value pair sets of the leaf node) that are newer than the newest key-value pair set in the second list of key-value pair sets, which may result in the most garbage (or duplicate keys) being able to be reclaimed. When all key-value pairs in the second list of key-value pair sets are shadowed (e.g., made garbage) by entries in a single key-value pair set, only the single key-value pair set may be included in the first list of key-value pair sets to improve efficiency.

In some implementations, regarding the first list of key-value pair sets which may be sparse, the first list of key-value pair sets may be any subset of a set of key-value pair sets in a root node and in a leaf node that are newer than a newest key-value pair set in the second list of key-value pair sets. When Y newer key-value pair sets are available, then 2Y possibilities may be available for the first list of key-value pair sets. A cost of evaluating one of those 2Y possibilities may involve multiple log union operations, each of which may involve a bitwise XOR operation of a 16K buffer. In some implementations, the first list of key-value pair sets may be restricted to be all newer key-value pair sets in a node associated with a compaction.

In some implementations, the memory device may select the first list of key-value pair sets and the second list of key-value pair sets (e.g., using heuristics). In some cases, from a plurality of key-value pair sets, the memory device may select at least two key-value pair sets to be included in the second list of key-value pair sets (e.g., rewriting a single key-value pair set may not collect any garbage).

In some implementations, in order to reduce a problem space, the first list of key-value pair sets may be all key-value pair sets newer than the newest key-value pair set in the second list of key-value pair sets. The first list of key-value pair sets may need to have at least one key-value pair set to benefit from this approach. For a node with A key-value pair sets, A(Z−1)/2 options may be available for selecting the first list of key-value pair sets and the second list of key-value pair sets. The memory device may consume a certain amount of processing time and memory to determine the best option from the possible options. In some implementations, all uncompacted key-value pair sets may be included as part of the first list of key-value pair sets. Uncompacted key-value pair sets may be the least likely to contain duplicate keys (or garbage). A first portion of remaining key-value pair sets may be included as part of the first list of key-value pair sets, and a second portion of remaining key-value pair sets may be included as part of the second list of key-value pair sets.

In some implementations, during a z-compaction, the second list of key-value pair set may be rewritten (or replaced by) a new key-value pair set, which may involve reading a plurality of keys and values and rewriting some of the keys and values into the new key-value pair set. The z-compaction may involve a considerable number of read operations on the first list of key-value pair sets, but may not involve write operations for the first list of key-value pair sets. For example, two key-value pair sets may be garbage and two key-value pair sets may be untouchable, and one new key-value pair set may be created to replace the two key-value pair sets that are garbage. Since the memory device is already reading the two key-value pair sets that are untouchable, the memory device may regenerate an index, which may correspond to a sorted list of keys. The memory device may create a new version of the two key-value pair sets that are untouchable, which may correspond to key-compacted key-value pair sets. The memory device may perform a key compaction on the key-value pair sets which are untouchable. As a result, the index may be regenerated on key-value pair sets that are untouchable.

In some implementations, instead of creating a key-compacted key-value pair set from a set of untouchable key-value pair sets (U) and z-compacted key-value pair set from a set of garbage key-value pair sets (G), the memory device may create one new key-value pair set that is a blend of key compaction and key-value compaction. The one new key-value pair set may inherit value blocks from the set of untouchable key-value pair sets and may create new value blocks for the set of garbage key-value pair sets. When a blended key and key-value compacted key-value pair set is created to replace key-value pair sets in the set of untouchable key-value pair sets and key-value pair sets in the set of garbage key-value pair sets, the memory device may use a log to estimate various metrics. The memory device may use the log to estimate an amount of data sourced from the set of garbage key-value pair sets that is written to an output key-value pair set (keys and values). The memory device may use the log to estimate an amount of data sourced from the set of untouchable key-value pair sets that is written to an output key-value pair set (keys only). The memory device may use the log to estimate an amount of data collected from the set of garbage key-value pair sets. The memory device may use such metrics for determining whether to employ such an operation (e.g., z-compaction), and if so, which key-value pair sets to use for the set of untouchable key-value pair sets and which key-value pair sets to use for the set of garbage key-value pair sets.

In some implementations, given a set of key-value pair sets (S), pkeys(S) may indicate a number of physical keys in S (e.g., a sum of key-value pair set keys and not eliminating duplicate keys), ukeys(S) may indicate a number of unique keys in S (e.g., as determined using a log), kalen(S) may indicate the length of all keys in S, and valen(S) may indicate the length of all values in S. Then, ukeys(U+G)–ukeys(G) may equal a number of keys and values pulled from the set of untouchable key-value pair sets and written to an output key-value pair set, ukeys(U+G)–ukeys(U) may equal a number of keys and values pulled from the set of garbage key-value pair sets and written to an output key-value pair set, and pkeys(G)–(ukeys(U+G)–ukeys(U)) may equal a number of keys garbage collected from the set of garbage key-value pair sets. Such metrics may be used to estimate byte counts instead of key counts.

In some implementations, the memory device may consider whether a key-value pair set is key-compacted when determining whether the key-value pair set should be included in the first list of key-value pair sets (untouchable key-value pair sets) or the second list of key-value pair sets (garbage key-value pair sets). When a particular key-value pair set is associated with a considerable amount of garbage from a key compaction, that key-value pair set may be included in the second list of key-value pair sets, which may allow the garbage to be reclaimed. Otherwise, if the particular key-value pair set is included in the first list of key-value pair sets, space associated with the garbage may not be reclaimed because the first list of key-value pair sets may not be rewritten. In some cases, one key-value pair set may have garbage when the key-value pair set has been compacted numerous times because garbage may not be eliminated from key compacted key-value pair sets.

As an example, the memory device may identify 8 key-value pair sets. The memory device may select two of the 8 key-value pair sets as garbage key-value pair sets, and the remaining six key-value pair sets as untouchable key-value pair sets. The memory device may select zero or more of those six key-value pair sets to be the untouchable key-value pair sets. The untouchable key-value pair sets may be rewritten, whereas the garbage key-value pair sets may become rewritten.

Figure 6:
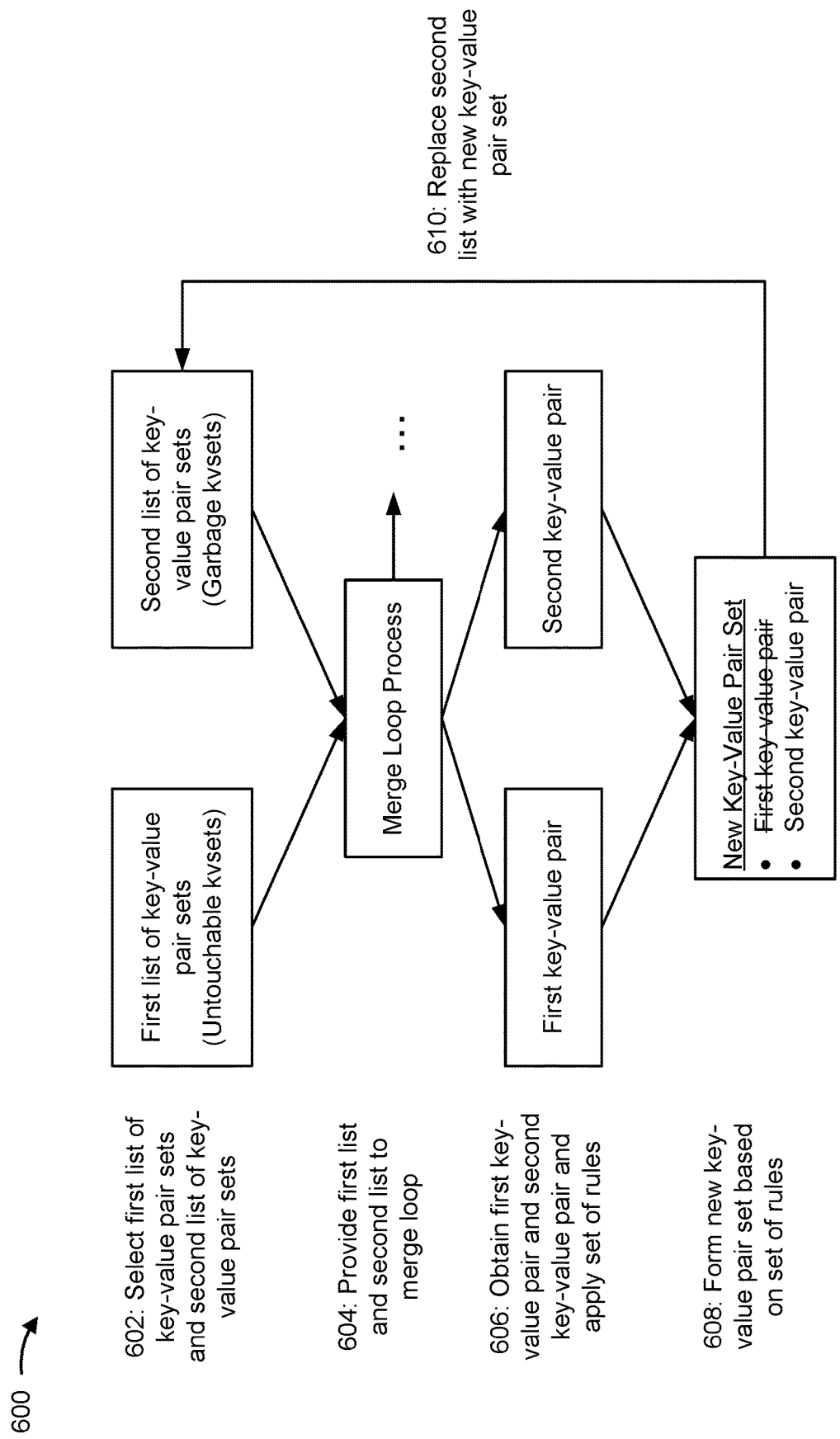
FIG. 6 is a diagram illustrating an example of replacing key-value pair sets with new key-value pair sets.

FIG. 6 is a diagram of an example 600 of replacing key-value pair sets with new key-value pair sets. The operations described in connection with FIG. 6 may be performed by the memory device 120 and/or one or more components of the memory device 120, such as the controller 130 and/or one or more components of the controller 130.

In some implementations, the memory device 120 may perform a garbage collection (e.g., a z-compaction) on key-value pair sets to remove duplicate keys (or garbage) from the key-value pair sets. For example, the same key may be stored in multiple key-value pair sets. A newer version of the key may be needed, but older versions of the key may be duplicate versions and considered to be garbage. The memory device 120 may perform the garbage collection in accordance with a predefined schedule, or based on an amount of garbage satisfying a threshold.

As shown by reference number 602, during the garbage collection, the memory device 120 may select a first list of key-value pair sets. The first list of key-value pair sets may be untouchable key-value pair sets, which may not be replaced during the garbage collection. The memory device 120 may select a second list of key-value pair sets. The second list of key-value pair sets may be garbage key-value pair sets, which may be replaced during the garbage collection. The key-value pair sets in the first list of key-value pair sets may be newer than key-value pair sets in the second list of key-value pair sets. The first list of key-value pair sets and the second list of key-value pair sets may be input key-value pair sets. The first list of key-value pair sets and the second list of key-value pair sets may be associated with an LSM tree. The LSM tree may be part of an LSM key-value database.

In some implementations, the first list of key-value pair sets may include sparse key-value pair sets that are ordered by age, which may mean that not all contiguous key-value pair sets are included in the first list of key-value pair sets. For example, a key-value pair set associated with time 1 (T1) and a key-value pair set associated with time 3 (T3) may be included in the first list of key-value pair sets, but a key-value pair set associated with time 2 (T2) may not be included in the first list of key-value pair sets. The sparse key-value pair sets may include key-value pair sets that are newer than key-value pair sets in the second list of key-value pair sets.

As shown by reference number 604, the memory device 120 may provide the first list of key-value pair sets and the second list of key-value pair sets to a merge loop process. The merge loop process may be a process that runs at the memory device 120. The merge loop process may continuously obtain key-value pair sets as input, and then provide an output based on the inputted key-value pair sets.

As shown by reference number 606, the memory device 120 may obtain, via the merge loop process, a first key-value pair and a second key-value pair. The first key-value pair and the second key-value pair may be an output of the merge loop process. The memory device 120 may apply a set of rules to each of the first key-value pair and the second key-value pair. The memory device 120 may either keep the first key-value pair or discard the first key-value pair based on the set of rules. The memory device 120 may either keep the first key-value pair or discard the first key-value pair based on the set of rules. In some implementations, the memory device 120 may discard the first key-value pair in accordance with the set of rules based on the first key-value pair being included in the first list of key-value pair sets. The memory device 120 may keep the second key-value pair in accordance with the set of rules based on the second key-value pair being included in the second list of key-value pair sets. The memory device 120 may repeat this process for each key-value pair that is outputted from the merge loop process (e.g., apply the set of rules to determine whether the key-value pair should be discarded or kept).

As shown by reference number 608, the memory device 120 may form a new key-value pair set based on the key-value pairs outputted from the merge loop process. The memory device 120 may form the new key-value pair set to not include the first key-value pair and to include the second key-value pair in accordance with the set of rules. The new key-value pair set may not include the first key-value pair in accordance with the set of rules based on the first key-value pair being included in the first list of key-value pair sets. The first key-value pair may be associated with a duplicate key and may be discarded when forming the new key-value pair set. The new key-value pair set may include the second key-value pair in accordance with the set of rules based on the second key-value pair being included in the second list of key-value pair sets. The second key-value pair may be kept when forming the new key-value pair set. The new key-value pair set may be an output key-value pair set. In some implementations, key-value pairs that are discarded based on the set of rules may not be included in the new key-value pair set. Key-value pairs that are kept based on the set of rules may be included in the new key-value pair set.

In some implementations, a key-value pair outputted from the merge loop that is able to be discarded may be discarded. The key-value pair may be able to be discarded based on a newer version of the key-value pair being available in some other key-value pair set. A key-value pair outputted from the merge loop that should be kept (e.g., based on the key being newer than other versions of the same key) and is from the first list of key-value pair sets may be discarded. A key-value pair outputted from the merge loop that should be kept (e.g., based on the key being newer than other versions of the same key) and is from the second list of key-value pair sets may be written to the new key-value pair set. The key-value pair may be written to the new key-value pair set because no newer version of the key may be available in another key-value pair set.

As shown by reference number 610, the memory device 120 may replace the second list of key-value pair sets with the new key-value pair set. The second list of key-value pair sets, which may correspond with the garbage key-value pair sets, may be replaced with the new key-value pair set, thereby eliminating garbage stored in the memory device 120. The first list of key-value pair sets may not be replaced with other key-value pair sets. The first list of key-value pair sets, which may correspond with the untouchable key-value pair sets, may not be modified during the garbage collection. As a result, the memory device 120 may be able to collect garbage without significant write amplification because the memory device 120 may only rewrite key-value pairs that should be kept and came from the second list of key-value pair sets.

In some implementations, the memory device 120 may regenerate an index of sorted keys for the first list of key-value pair sets based on the second list of key-value pair sets being replaced with the new key-value pair set. In other words, the memory device 120 may regenerate the index for the untouchable key-value pair sets, which may be based on the memory device 120 needing to read the untouchable key-value pair sets during the garbage collection. In some implementations, the memory device 120 may create the new key-value pair set, such that the new key-value pair set may inherit value data from the first list of key-value pair sets. The new key-value pair set may also create new value data for the second list of key-value pair sets. The new key-value pair set may be a blend of a key compaction and a key-value compaction. In some implementations, the memory device 120 may determine a first amount of key-value data from the second list of key-value pair sets that is used to form the new key-value pair set (keys and values). The memory device 120 may determine a second amount of key data from the first list of key-value pair sets that is used to form the new-key value pair set (keys only). The memory device 120 may determine a third amount of duplicate key-value data from the second list of key-value pair sets. The memory device 120 may select the first list of key-value pair sets and the second list of key-value pair sets based on the first amount, the second amount, and/or the third amount.

As indicated above, FIG. 6 is provided as an example. Other examples may differ from what is described with regard to FIG. 6.

FIG. 7 is a diagram of an example 700 of different lists of key-value pair sets. The operations described in connection with FIG. 7 may be performed by the memory device 120 and/or one or more components of the memory device 120, such as the controller 130 and/or one or more components of the controller 130.

As shown in FIG. 7, a node may be associated with five key-value pair set, in which case 5(5−1)/2 (or 10) options may be available when selecting a first list of key-value pair sets (untouchable key-value pair sets) and a second list of key-value pair sets (garbage key-value pair sets). The five key-value pair sets may be represented by 1, 2, 3, 4, and 5. In a first option, 5 may be untouchable, 4, 3, 2, and 1 may be garbage, and no key-value pair sets may be ignored. In a second option, 5 may be untouchable, 4, 3, and 2 may be garbage, and 1 may be ignored. In a third option, 5 may be untouchable, 4 and 3 may be garbage, and 2 and 1 may be ignored. In a fourth option, 5 may be untouchable, 4 may be garbage, and 3, 2 and 1 may be ignored. In a fifth option, 5 and 4 may be untouchable, 3, 2, and 1 may be garbage, and no key-value pair sets may be ignored. In a sixth option, 5 and 4 may be untouchable, 3 and 2 may be garbage, and 1 may be ignored. In a seventh option, 5 and 4 may be untouchable, 3 may be garbage, and 2 and 1 may be ignored. In an eighth option, 5, 4, and 3 may be untouchable, 2 and 1 may be garbage, and no key-value pair sets may be ignored. In a nineth option, 5, 4 and 3 may be untouchable, 2 may be garbage, and 1 may be ignored. In a tenth option, 5, 4, 3, and 2 may be untouchable, 1 may be garbage, and no key-value pair sets may be ignored.

As indicated above, FIG. 7 is provided as an example. Other examples may differ from what is described with regard to FIG. 7.

An update may involve a new key with a value. The update may be an update to an existing key (with presumably a new value). Updates may be in the form of new key-value pairs. The updates may be collected into an object in memory, which may be associated with an update-in-place. At this point, the updates may not form a key-value pair set (or kvset). When a size of the updates reaches a certain level (e.g., 1 GB), the updates may be written to disk (e.g., non-volatile memory). The updates may be written as a key-value pair set, which may include a plurality of key-value pairs. The key-value pair set may not include duplicate keys. In other words, the updates may be matched. The updates may be collected into a temporary update-in-place in-memory data structure, and when the in-memory data structure becomes sufficiently large (e.g., 1 GB), the updates may be written to disk as the key-value pair set. Within the key-value pair set, keys may be organized into an index (e.g., sorted), such that a certain key and its corresponding value may be quickly found. In some cases, a key may have no corresponding value, or a key may be associated with one value or with multiple values.

As a memory device performs more batched updates, multiple key-value pair sets may be created. Although a single key-value pair set may not have duplicate data (or garbage) because duplicate keys may not be present, when a newer key-value pair set is created, the newer key-value pair set may include updates to keys that are in an older key-value pair set. The keys that are in the older key-value pair set would now be considered duplicate keys (or garbage). In an LSM approach, key-value pair sets may be newer (or younger) or older in relation to other key-value pair sets. When looking for a certain key, in some cases dozens of key-value pair sets may be searched in order to find that key.

An LSM key-value database may include a list of multiple key-value pair sets (kvsets), which may be ordered by age. Each key-value pair set by itself may be a compact structure, by multiple key-value pair sets may need to be searched in order to find a particular key. The LSM key-value database may be organized as a two-level LSM tree. The higher a key is in the LSM tree, the newer that key may be, which may be in relation to other keys in the LSM tree. The key that is higher in the LSM tree may be newer than a key that is lower in the LSM trec. The LSM tree may have a root node, which may be associated with a list of key-value pair sets. If the list of key-value pair sets is running left to right, then the list of key-value pair sets may span from newer (or younger) key-value pair sets to older key-value pair sets. The LSM tree may have one or more leaf nodes. Each leaf node may be associated with a list of key-value pair sets. The root node may have newer data as compared to data associated with the leaf nodes. When a batch update is performed, a key-value pair set may be written into the root node as the newest key-value pair set.

A legacy spill operation may move key-value pair sets from the root node to one or more of the leaf nodes. The legacy spill operation may be needed due to the tree structure of the LSM key-value database. As updates occur in memory and reach a certain size (e.g., 1 GB), a key-value pair set may be created and inserted into the root node. The key-value pair set may be the newest key-value pair set in the root node. The root node may have a list of key-value pair sets ordered by age. Each leaf node may also have a list of key-value pair sets ordered by page. The legacy spill operation may take the list of key-value pair sets in the root node, and split or divide them to form split key-value pair sets, and then move the split key-value pair sets to the leaf nodes. The split key-value pair sets may move from the root node to the leaf node based on an edge key. During the legacy spill operation, the memory device may identify the keys in the key-value pair sets that are in the root node, and the memory device may determine, for each key in the root node, which leaf node should obtain the key. Each leaf node may be associated with an edge key, and when the key in the root node matches an edge key of a particular leaf node, the key may be directed to that particular leaf node. After keys are directed to a particular leaf node, those keys may be used to form a new key-value pair set in that leaf node. The legacy spill operation may involve creating new key-value pair sets in those leaf nodes using the keys that are directed to those leaf nodes. The legacy spill operation may involve removing old key-value pair sets from the root node. The legacy spill operation may involve "spilling" keys and corresponding values from the root node to the leaf nodes.

In the legacy spill operation, a plurality of old key-value pair sets in the root node may be rewritten in the leaf nodes. The legacy spill operation may involve rewriting all data in input key-value pair sets, which may be in the root node. The legacy spill operation may involve creating the new key-value pair sets in each leaf node, depending on which keys are written to specific leaf nodes. The LSM key-value database may have between one and 1024 leaf nodes, depending on a design of the LSM key-value database. An empty LSM key-value database may have just a single root node and a single leaf node, but both the root node and the leaf node may be empty. As more data forms in the root node, the data may get spilled to that single leaf node, and eventually multiple leaf nodes may be formed. The legacy spill operation may involve moving data from the root node to the leaf nodes. The memory device may look at every single key that is in the root node, and the memory device may put the keys in appropriate leaf nodes based on the edge keys. The legacy spill operation involves a significant amount of read and write operations because each key may be copied from the root node to one of the leaf nodes.

As an example, the LSM key-value database may include 26 leaf nodes. An edge key may be defined between each of the 26 leaf nodes. For example, keys between A and B may be directed to a first leaf node, keys between B and C may be directed to a second leaf node, and so on, where A, B, and C may represent edge keys. As another example, keys that start with A may be directed to the first leaf node, keys that start with B may be directed to the second leaf node, keys that start with C may be directed to the third leaf node, and so on, where A, B, and C may represent edge keys.

In some implementations, the memory device may implement a new spill operation, which may be referred to as a zero-write-amplification spill (or z-spill) operation. When a plurality of keys (e.g., all keys) in a key-value pair set of the root node partially match and would otherwise by associated with the same leaf node based on the edge key associated with the leaf node, the memory device may not read and rewrite every single key in the key-value pair set of the root node. Rather, the memory device may rename (or relocate or relink) the key-value pair set in the root node into that leaf node. When the memory device determines that all keys in the key-value pair set would otherwise end up in the same leaf node, the memory device may rename the key-value pair set in the root node to that leaf node. The new spill operation may involve renaming the plurality of keys instead of copying every key from the key-value pair set from the root node to one or more leaf nodes, which may avoid reading the keys in the key-value pair set of the root node and rewriting the keys to the one or more leaf nodes. The new spill operation may not involve looking at each key in the key-value pair set and then distributing the key to an appropriate leaf node based on edge keys, which may reduce the write amplification for the memory device. Further, the root node may be associated with a first non-volatile memory storage level, and the leaf nodes may be associated with a second non-volatile memory storage level.

In some implementations, renaming the key-value pair set may be a metadata-only operation. The metadata-only operation may involve a metadata update. By updating the metadata (e.g., h-blocks) associated with the key-value pair set, the key-value pair set may go from being associated with the root node to being associated with one of the leaf nodes. The metadata update may be similar to a directory update or a file rename, in which a file in directory A is moved to directory B based on the directory update (e.g., the file itself is not moved). On the other hand, in the legacy spill operation, the key-value pair set may be physically moved or copied from one memory location to another memory location. The legacy spill operation may be similar to a file copy, which involves reading and writing keys and values, whereas the new spill operation may be similar to a file rename, which does not involve reading and writing keys and values.

As an example, the root node may include 8 key-value pair sets, where each key-value pair set may be 1 GB in size. With the legacy spill operation, all 8 GB of data may be copied. New key-value pair sets may be created with that 8 GB of data, but the data may be organized differently because the data may be moved to the different leaf nodes. Then, the 8 key-value pair sets may be deleted from the root node. With the new spill operation, the 8 key-value pair sets may simply be renamed, which may be based on a metadata update. The metadata update may involve writing a few hundred bytes, which is significantly less than writing the 8 GB of data.

In some implementations, with the new spill operation, the memory device may determine that all keys in a particular key-value pair set may be associated with the same leaf node. The keys may be sorted in each key-value pair set by age. The memory device may look at a beginning key for the key-value pair set and an end key for the key-value pair set. When both the beginning key and the end key are associated with the same leaf node based on the edge key associated with that leaf node, the memory device may rename that key-value pair set. The memory device may look at each key-value pair set in the root node, and the memory device may know its smallest key and its largest key. Based on an edge map, which may indicate an edge key associated with each leaf node, the memory device may determine if one or more of the key-value pair sets fit into one leaf node.

In some implementations, a trigger for a spill operation may be based on a certain size of the root node. For example, when the root node reaches N key-value pair sets, the spill operation may be triggered. After the spill operation is triggered, the memory device may determine whether the legacy spill operation or the new spill operation is appropriate. For a given key-value pair set, when all keys in that key-value pair set are associated with the same leaf node, the memory device may apply the new spill operation. For a given key-value pair set, when different keys in that key-value pair set are associated with different leaf nodes, the memory device may apply the legacy spill operation. Out of the N key-value pair sets, only some key-value pair sets may be eligible for the new spill operation, while other key-value pair sets may be handled using the legacy spill operation.

As an example, the root node may include a first key-value pair set (S1) (newest), a second key-value pair set (S2), a third key-value pair set (S3), and a fourth key-value pair set (S4) (oldest). The memory device may determine that S4 and S3 do not satisfy criteria for the new spill operation, where the criteria may be that all keys in a particular key-value pair set would otherwise go to the same leaf node. The memory device may apply the legacy spill operation to S4 and S3, which may involve reading and writing keys and values in S4 and S3. The memory device may determine that S2 satisfies the criteria for the new spill operation. The memory device may apply the new spill operation to S2, which may involve renaming S2. The memory device may determine that S1 does not satisfy the criteria for the new spill operation. The memory device may apply the legacy spill operation to S1.

In some implementations, the new spill operation may provide various benefits over the legacy spill operation. The new spill operation may be associated with less read amplification and less write amplification, as compared to the legacy spill operation, due to the renaming of the key-value pair sets. The renaming of the key-value pair sets may involve less reading and writing, as compared to employing copy and delete operations. The new spill operation may be faster than the legacy spill operation due to the less read amplification and the less write amplification. The new spill operation may cause less wear and tear on the memory device due to the less read amplification and the less write amplification. The new spill operation may provide better performance on quad-level cell (QLC) memory devices as compared to the old spill operation. The QLC memory devices may have worse write performance as compared to triple-level cell (TLC) memory devices. A QLC memory device may provide more storage than a TLC memory device for the same silicon area, but the QLC memory device may be slower than the TLC memory device. The new spill operation may be helpful with QLC memory devices due to the worse write performance associated with the QLC memory devices. The new spill operation may be associated with fewer input/output operations per second (IOPS), as compared to the legacy spill operation, which may lead to cost savings for cloud storage in a cloud environment.

Figure 8:
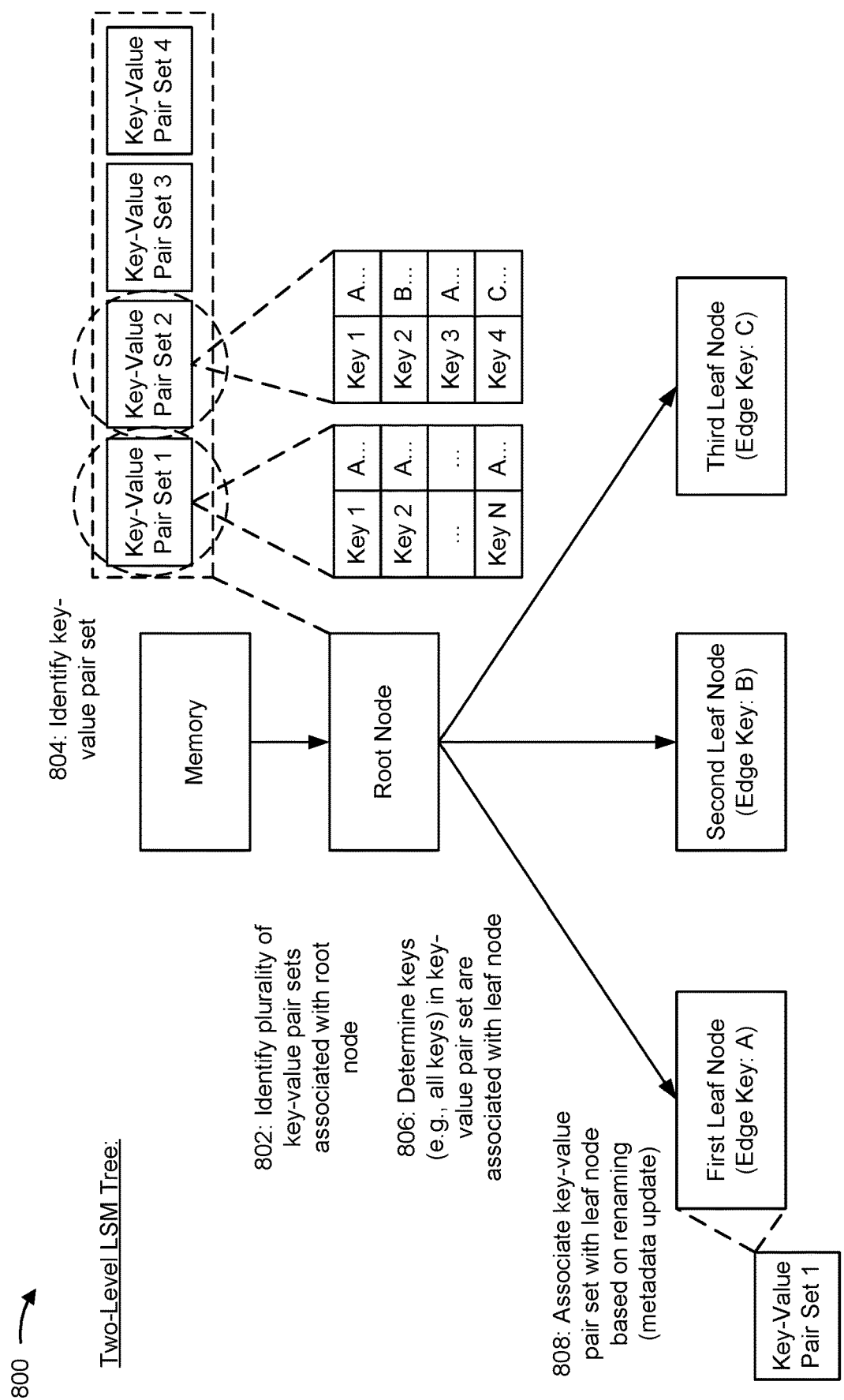
FIG. 8 is a diagram illustrating an example of replacing key-value pair sets with new key-value pair sets.

FIG. 8 is a diagram of an example 800 of replacing key-value pair sets with new key-value pair sets. The operations described in connection with FIG. 8 may be performed by the memory device 120 and/or one or more components of the memory device 120, such as the controller 130 and/or one or more components of the controller 130.

In some implementations, the memory device 120 may maintain an LSM key-value database. The LSM key-value database may implement a two-level LSM tree. The LSM tree may include a root node and one or more leaf nodes. The root node may be associated with a first level. The one or more leaf nodes may be associated with a second level. The root node may include one or more key-value pair sets ordered by age. Each leaf node may include one or more key-value pair sets ordered by age. The root node and the one or more leaf nodes may be associated with non-volatile memory storage. The root node may be associated with newer data than data associated with the one or more leaf nodes.

In some implementations, when a size of the root node satisfies a threshold, the memory device 120 may trigger a spill operation on the key-value pair sets that are in the root node. The spill operation may be a legacy spill operation or a new spill operation (z-spill) depending on the keys in each key-value pair set.

As shown by reference number 802, during the spill operation, the memory device 120 may identify a plurality of key-value pair sets associated with a root node. For example, the memory device 120 may identify a first key-value pair set, a second key-value pair set, a third key-value pair set, and a fourth key-value pair set. The first key-value pair set may be the newest key-value pair set among the plurality of key-value pair sets. The fourth key-value pair set may be the oldest key-value pair set among the plurality of key-value pair sets.

In some implementations, the memory device 120 may determine that a quantity of the plurality of key-value pair sets associated with the root node satisfies a threshold. The memory device 120 may identify the plurality of key-value pair sets based on the quantity satisfying the threshold. The memory device 120 may identify the plurality of key-value pair sets based on a size of data stored in the root node satisfying a threshold and/or based on a number of key-value pair sets in the root node satisfying a threshold, which may trigger the memory device 120 to initiate the spill operation.

As shown by reference number 804, the memory device 120 may identify a key-value pair set from the plurality of key-value pair sets. The key-value pair set may include a plurality of key-value pairs. The memory device 120 may initially identify the first key-value pair set in the plurality of key-value pair sets. The memory device 120 may subsequently identify every other key-value pair set in the plurality of key-value pair sets.

As shown by reference number 806, the memory device 120 may determine that a plurality of keys in the key-value pair set are associated with a leaf node in the one or more leaf nodes based on an edge key associated with the leaf node. The memory device 120 may determine that all keys in the key-value pair set are associated with the same leaf node in the one or more leaf nodes. The memory device 120 may order the plurality of keys in the key-value pair set by age. The memory device 120 may determine a beginning key in the key-value pair set. The memory device 120 may determine an end key in the key-value pair set. When the beginning key and the end key are the same, the memory device 120 may determine that all keys in the key-value pair set are associated with the same leaf node.

In some implementations, the memory device 120 may determine to perform the new spill operation (e.g., a z-spill operation) based on the plurality of keys in the key-value pair set being associated with the same leaf node. When the plurality of keys in the key-value pair set are not associated with the same leaf node, the memory device 120 may determine to perform a legacy spill operation.

As shown by reference number 808, the memory device 120 may associate the key-value pair set with the leaf node based on a renaming (or relocating or re-linking) of the key-value pair set, such that the key-value pair set may become associated with the leaf node and may no longer be associated with the root node. The key-value pair set may become decoupled from the root node. The renaming of the key-value pair set may not involve reading the key-value pair set from the root node and writing the key-value pair set to the leaf node. The renaming of the key-value pair set may exclude reading the key-value pair set from the root node and writing the key-value pair set to the leaf node. The renaming of the key-value pair set may involve updating metadata associated with the key-value pair set to cause the key-value pair set to be associated with the leaf node and to no longer be associated with the root node. The memory device 120 may associate the key-value pair set with the leaf node based on a metadata update of the key-value pair set, where the metadata update of the key-value pair set may involve a near-zero read amplification and a near-zero write amplification.

In some implementations, the key-value pair set may be a first key-value pair set. The memory device 120 may identify a second key-value pair set from the plurality of key-value pair sets. The memory device 120 may determine that different keys in the second key-value pair set are associated with different leaf nodes in the plurality of leaf nodes based on different edge keys associated with the different leaf nodes. The memory device 120 may create new key-value pair sets in the different leaf nodes based on the different keys in the second key-value pair set. The new key-value pair sets may be created based on reading the second key-value pair set and writing portions of the second key-value pair set to the different leaf nodes.

As an example, a first leaf node may be associated with an edge key A, a second leaf node may be associated with an edge key B, and a third leaf node may be associated with an edge key C. The first key-value pair set may include a plurality of keys that all start with A. Since all of the keys in the first key-value pair set start with A, the memory device 120 may not read each key in the first key-value pair set and write each key in the first key-value pair set to the first leaf node. The memory device 120 may not move or copy the first key-value pair set from the root node to the first leaf node. Rather, the memory device 120 may update the metadata associated with the first key-value pair set, which may cause the first key-value pair set to be associated with the first leaf node instead of the root node. By updating the metadata, the memory device 120 may not copy the first key-value pair set between different memory locations, thereby eliminating the associated read amplification and write amplification. Further, in this example, the second key-value pair set may include keys that are associated with different leaf nodes. For example, in the second key-value pair set, a first key may be associated with the first leaf node, a second key may be associated with the second leaf node, a third key may be associated with the first leaf node, and a fourth key may be associated with a third leaf node. In this case, the memory device 120 may employ a legacy spill operation to copy keys in the second key-value pair set to the appropriate leaf nodes.

As indicated above, FIG. 8 is provided as an example. Other examples may differ from what is described with regard to FIG. 8.

In some implementations, a two-level LSM tree structure that includes a root node and leaf nodes may be employed for garbage collection. For example, a key-value pair set in a root node may have outdated information (or garbage). Based on a spill operation, the key-value pair set may be moved to a particular leaf node, such that this leaf node may now have the garbage. In order to eliminate that garbage, key-value pair sets in that leaf node may be rewritten. Without employing the two-level LSM tree structure, eliminating the garbage may involve combining numerous key-value pair sets. If all data was stored in only the root node, the root node may have 25 key-value pair sets, and to eliminate the garbage, all 25 key-value pair sets may need to be rewritten. By splitting the key-value pair sets to the different leaf nodes, garbage may be managed in smaller units. Since the two-level LSM tree structure may be employed, data may be moved from the root node to the leaf node via spill operations. Further, the two-level LSM tree structure may improve search speeds. Since key-value pair sets may be sorted by time, the key-value pair sets may be searched by age order. For example, when searching for a B key, only the root node and the one leaf node associated with B keys may be searched. As a result, employing the two-level LSM tree structure may reduce the number of key-value pair sets that are looked into in order to find a particular key.

Figure 9:
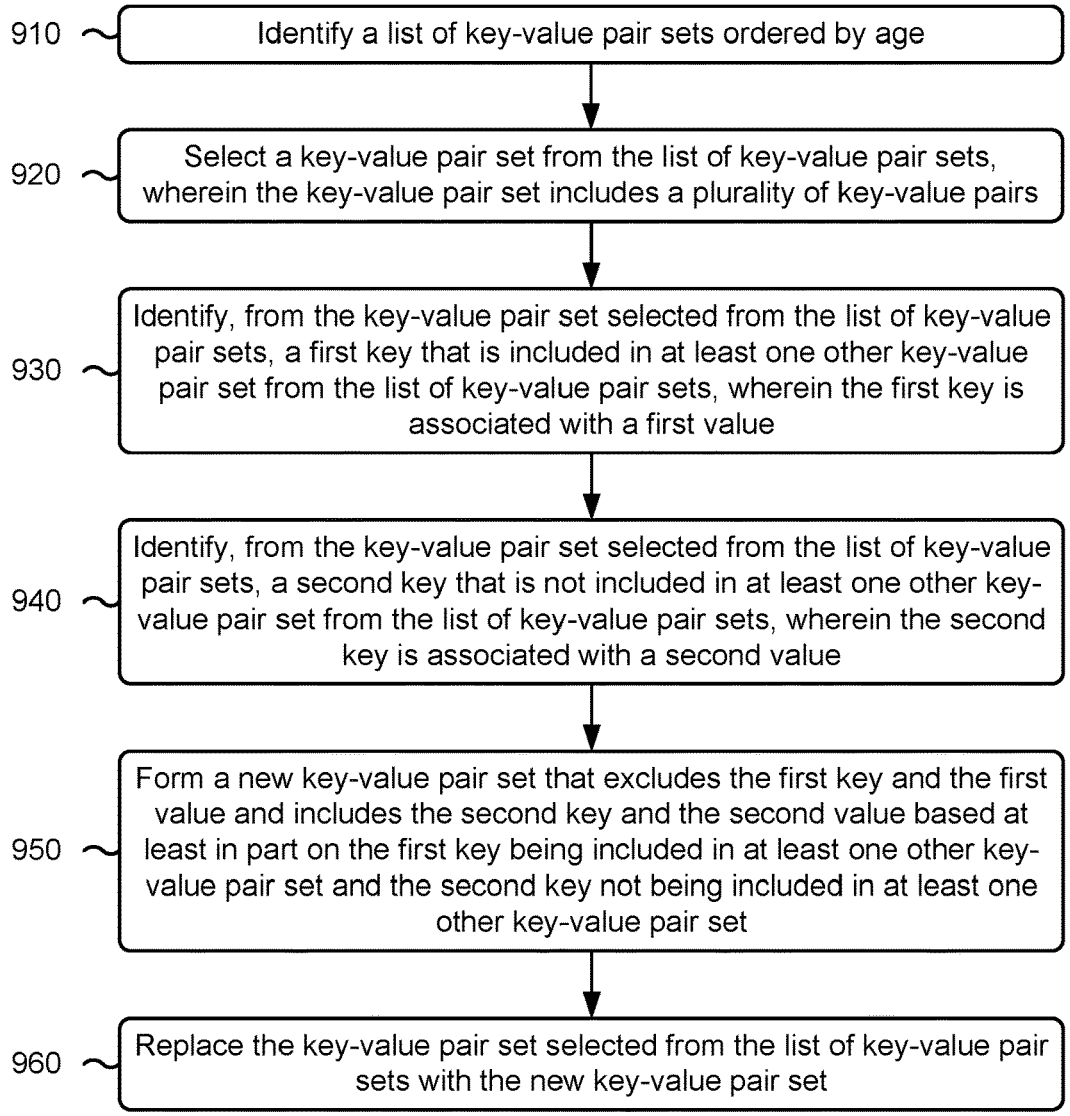
FIG. 9 is a flowchart of an example method associated with replacing key-value pair sets with new key-value pair sets.

FIG. 9 is a flowchart of an example method 900 associated with replacing key-value pair sets with new key-value pair sets. In some implementations, a memory device (e.g., the memory device 120) may perform or may be configured to perform the method 900. In some implementations, another device or a group of devices separate from or including the memory device (e.g., the system 100) may perform or may be configured to perform the method 900. Additionally, or alternatively, one or more components of the memory device (e.g., the controller 130, the memory management component 225, compact component 230, and/or spill component 235) may perform or may be configured to perform the method 900. Thus, means for performing the method 900 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 900.

As shown in FIG. 9, the method 900 may include identifying a list of key-value pair sets ordered by age (block 910). As further shown in FIG. 9, the method 900 may include selecting a key-value pair set from the list of key-value pair sets, wherein the key-value pair set includes a plurality of key-value pairs, and wherein the key-value pair set selected from the list of key-value pair sets is an oldest key-value pair set in relation to other key-value pair sets in the list of key-value pair sets (block 920). As further shown in FIG. 9, the method 900 may include identifying, from the key-value pair set selected from the list of key-value pair sets, a first key that is included in at least one other key-value pair set from the list of key-value pair sets, wherein the first key is associated with a first value (block 930). As further shown in FIG. 9, the method 900 may include identifying, from the key-value pair set selected from the list of key-value pair sets, a second key that is not included in at least one other key-value pair set from the list of key-value pair sets, wherein the second key is associated with a second value (block 940). As further shown in FIG. 9, the method 900 may include forming a new key-value pair set that excludes the first key and the first value and includes the second key and the second value based on the first key being included in at least one other key-value pair set and the second key not being included in at least one other key-value pair set (block 950). As further shown in FIG. 9, the method 900 may include replacing the key-value pair set selected from the list of key-value pair sets with the new key-value pair set (block 960).

The method 900 may include additional aspects, such as any single aspect or any combination of aspects described below and/or described in connection with one or more other methods or operations described elsewhere herein.

Although FIG. 9 shows example blocks of a method 900, in some implementations, the method 900 may include additional blocks, fewer blocks, different blocks, or differently arranged blocks than those depicted in FIG. 9. Additionally, or alternatively, two or more of the blocks of the method 900 may be performed in parallel. The method 900 is an example of one method that may be performed by one or more devices described herein. These one or more devices may perform or may be configured to perform one or more other methods based on operations described herein.

Figure 10:
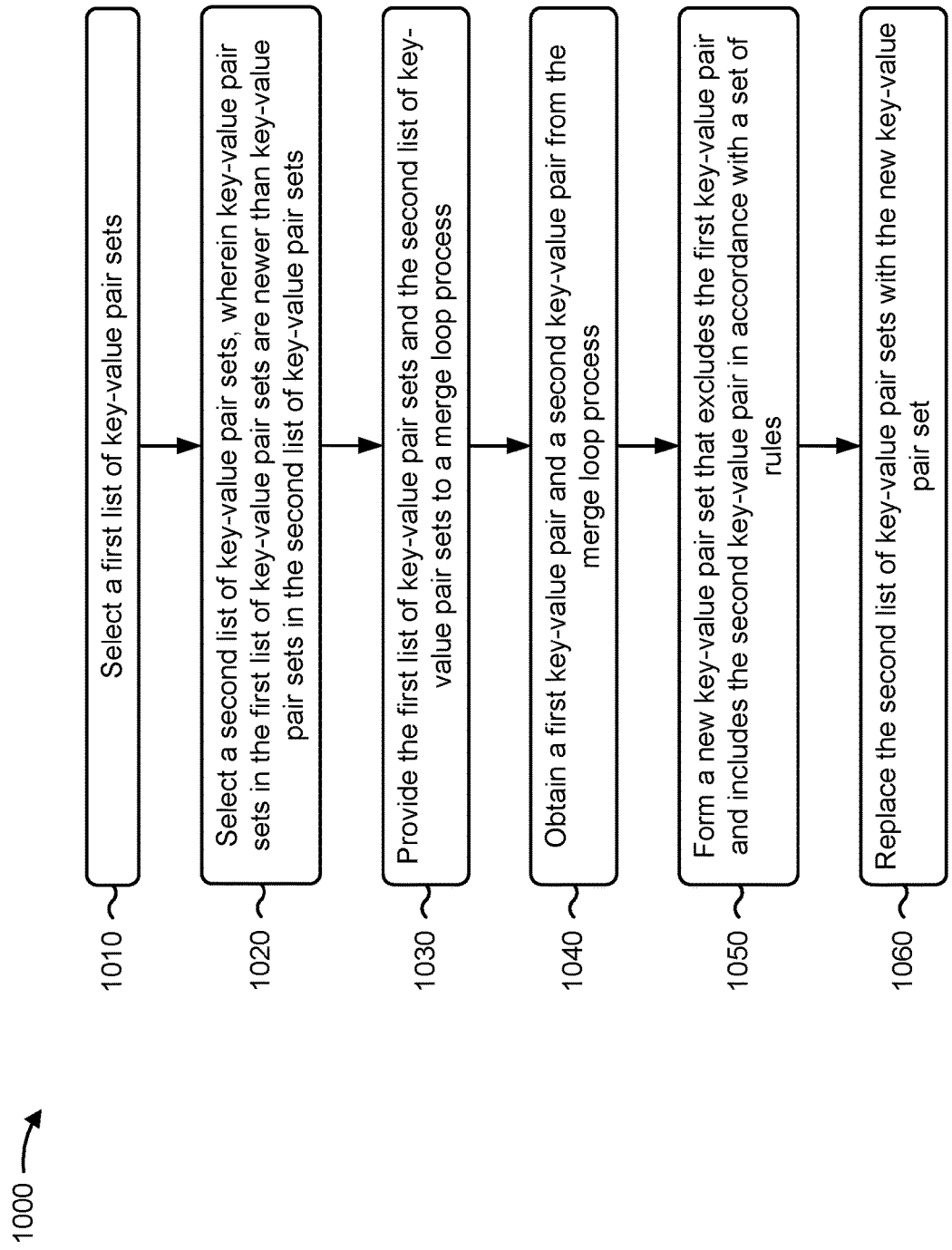
FIG. 10 is a flowchart of an example method associated with replacing key-value pair sets with new key-value pair sets.

FIG. 10 is a flowchart of an example method 1000 associated with replacing key-value pair sets with new key-value pair sets. In some implementations, a memory device (e.g., the memory device 120) may perform or may be configured to perform the method 1000. In some implementations, another device or a group of devices separate from or including the memory device (e.g., the system 100) may perform or may be configured to perform the method 1000. Additionally, or alternatively, one or more components of the memory device (e.g., the controller 130, the memory management component 225, compact component 230, and/or spill component 235) may perform or may be configured to perform the method 1000. Thus, means for performing the method 1000 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 1000.

As shown in FIG. 10, the method 1000 may include selecting a first list of key-value pair sets (block 1010). As further shown in FIG. 10, the method 1000 may include selecting a second list of key-value pair sets, wherein key-value pair sets in the first list of key-value pair sets are newer than key-value pair sets in the second list of key-value pair sets (block 1020). As further shown in FIG. 10, the method 1000 may include providing the first list of key-value pair sets and the second list of key-value pair sets to a merge loop process (block 1030). As further shown in FIG. 10, the method 1000 may include obtaining a first key-value pair and a second key-value pair from the merge loop process (block 1040). As further shown in FIG. 10, the method 1000 may include forming a new key-value pair set that excludes the first key-value pair and includes the second key-value pair in accordance with a set of rules (block 1050). As further shown in FIG. 10, the method 1000 may include replacing the second list of key-value pair sets with the new key-value pair set (block 1060).

The method 1000 may include additional aspects, such as any single aspect or any combination of aspects described below and/or described in connection with one or more other methods or operations described elsewhere herein.

Although FIG. 10 shows example blocks of a method 1000, in some implementations, the method 1000 may include additional blocks, fewer blocks, different blocks, or differently arranged blocks than those depicted in FIG. 10. Additionally, or alternatively, two or more of the blocks of the method 1000 may be performed in parallel. The method 1000 is an example of one method that may be performed by one or more devices described herein. These one or more devices may perform or may be configured to perform one or more other methods based on operations described herein.

Figure 11:
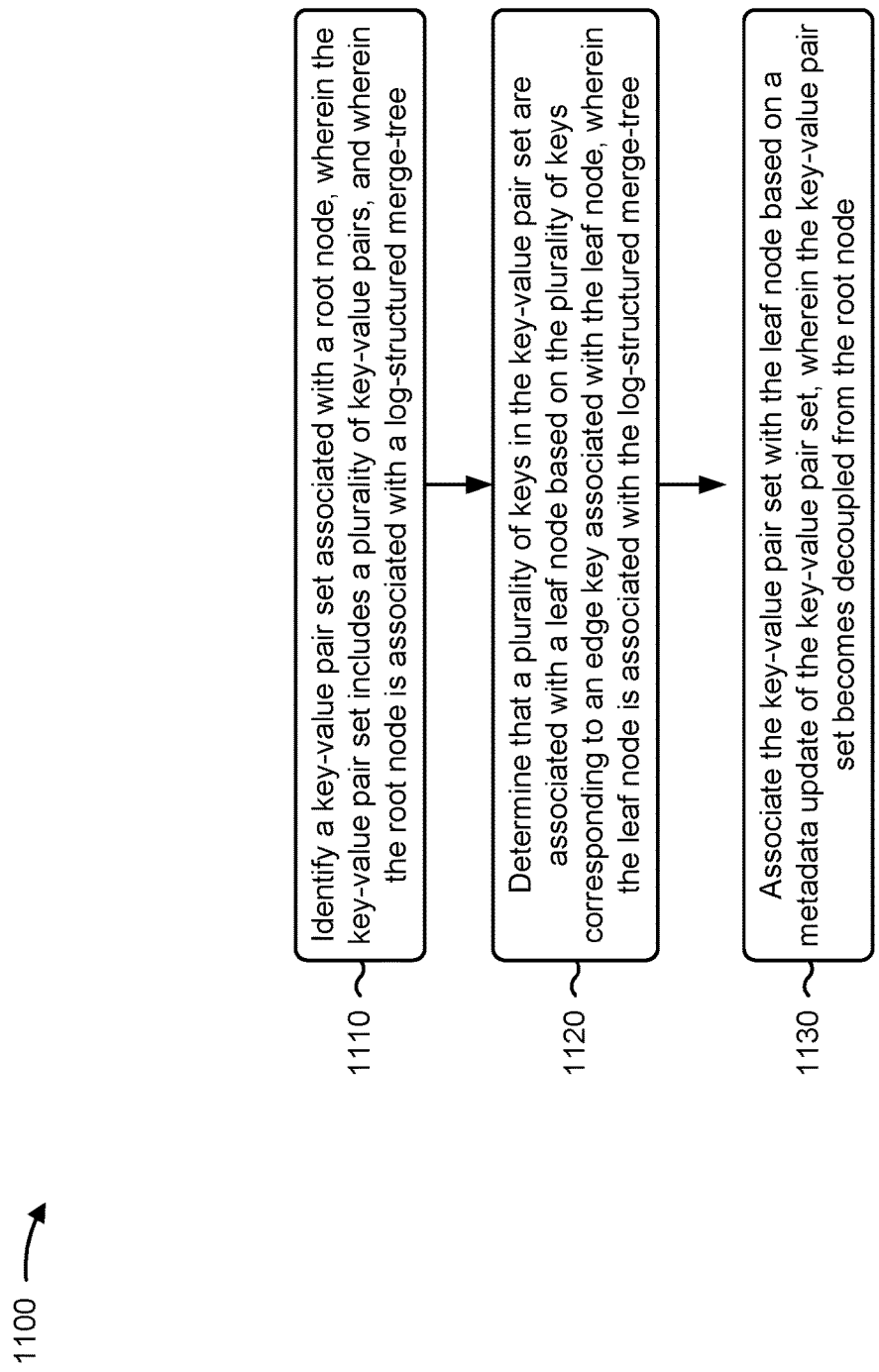
FIG. 11 is a flowchart of an example method associated with associating key-value pair sets with leaf nodes.

FIG. 11 is a flowchart of an example method 1100 associated with associating key-value pair sets with leaf nodes. In some implementations, a memory device (e.g., the memory device 120) may perform or may be configured to perform the method 1100. In some implementations, another device or a group of devices separate from or including the memory device (e.g., the system 100) may perform or may be configured to perform the method 1100. Additionally, or alternatively, one or more components of compact component 230, and/or spill component 235) may perform or may be configured to perform the method 1100. Thus, means for performing the method 1100 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 1100.

As shown in FIG. 11, the method 1100 may include identifying a key-value pair set associated with a root node, wherein the key-value pair set includes a plurality of key-value pairs, and wherein the root node is associated with a log-structured merge-tree (block 1110). As further shown in FIG. 11, the method 1100 may include determining that a plurality of keys in the key-value pair set are associated with a leaf node based on the plurality of keys corresponding to an edge key associated with the leaf node, wherein the leaf node is associated with the log-structured merge-tree (block 1120). As further shown in FIG. 11, the method 1100 may include associating the key-value pair set with the leaf node based on a metadata update of the key-value pair set, wherein the key-value pair set becomes decoupled from the root node (block 1130).

The method 1100 may include additional aspects, such as any single aspect or any combination of aspects described below and/or described in connection with one or more other methods or operations described elsewhere herein.

Although FIG. 11 shows example blocks of a method 1100, in some implementations, the method 1100 may include additional blocks, fewer blocks, different blocks, or differently arranged blocks than those depicted in FIG. 11. Additionally, or alternatively, two or more of the blocks of the method 1100 may be performed in parallel. The method 1100 is an example of one method that may be performed by one or more devices described herein. These one or more devices may perform or may be configured to perform one or more other methods based on operations described herein.

Figure 12:
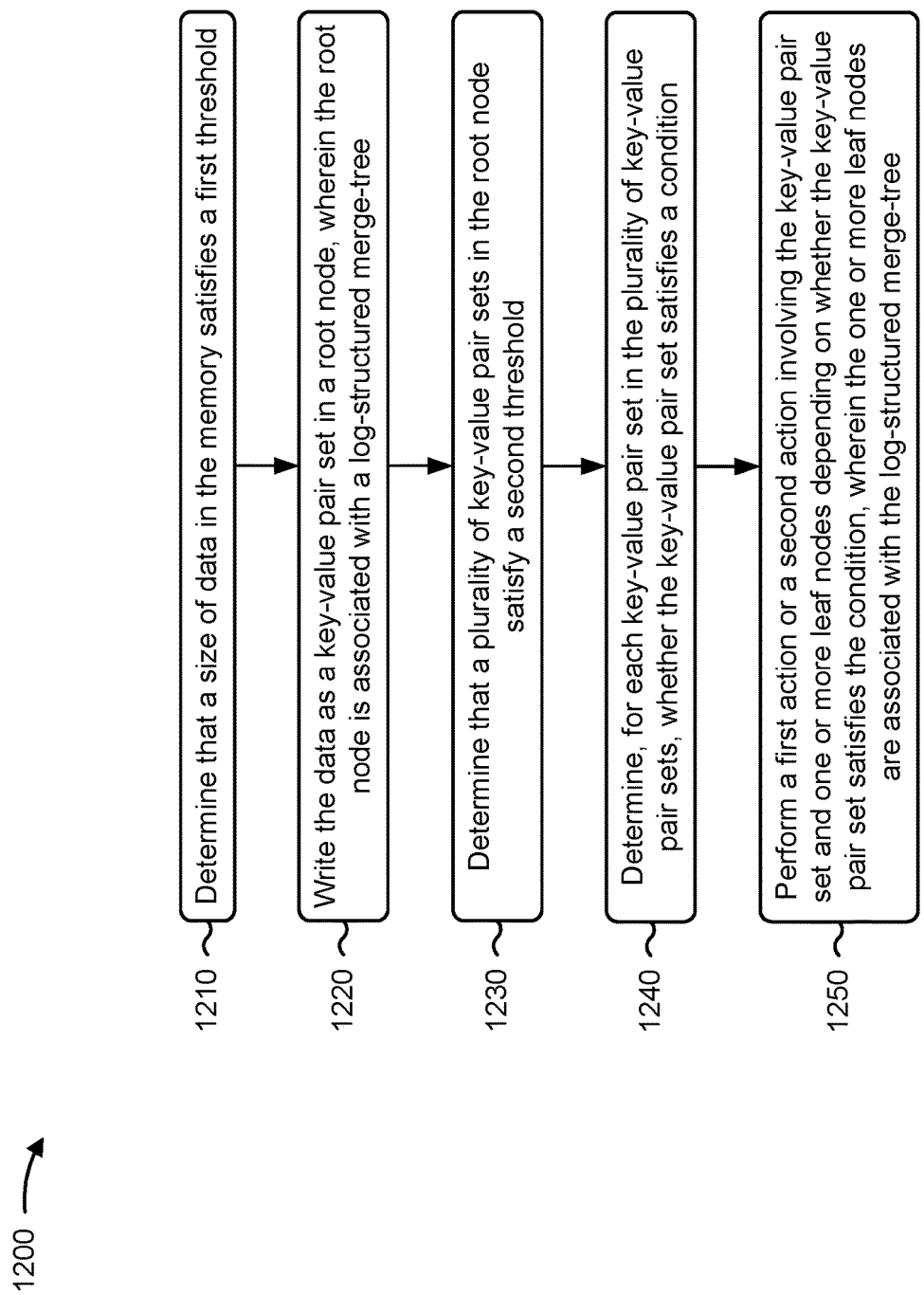
FIG. 12 is a flowchart of an example method associated with associating key-value pair sets with leaf nodes.

FIG. 12 is a flowchart of an example method 1200 associated with associating key-value pair sets with leaf nodes. In some implementations, a memory device (e.g., the memory device 120) may perform or may be configured to perform the method 1200. In some implementations, another device or a group of devices separate from or including the memory device (e.g., the system 100) may perform or may be configured to perform the method 1200. Additionally, or alternatively, one or more components of compact component 230, and/or spill component 235) may perform or may be configured to perform the method 1200. Thus, means for performing the method 1200 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 1200.

As shown in FIG. 12, the method 1200 may include determining that a size of data in the memory satisfies a first threshold (block 1210). As further shown in FIG. 12, the method 1200 may include writing the data as a key-value pair set in a root node, wherein the root node is associated with a log-structured merge-tree (block 1220). As further shown in FIG. 12, the method 1200 may include determining that a plurality of key-value pair sets in the root node satisfy a second threshold (block 1230). As further shown in FIG. 12, the method 1200 may include determining, for each key-value pair set in the plurality of key-value pair sets, whether the key-value pair set satisfies a condition (block 1240). As further shown in FIG. 12, the method 1200 may include performing a first action or a second action involving the key-value pair set and one or more leaf nodes depending on whether the key-value pair set satisfies the condition, wherein the one or more leaf nodes are associated with the log-structured merge-tree (block 1250).

The method 1200 may include additional aspects, such as any single aspect or any combination of aspects described below and/or described in connection with one or more other methods or operations described elsewhere herein.

Although FIG. 12 shows example blocks of a method 1200, in some implementations, the method 1200 may include additional blocks, fewer blocks, different blocks, or differently arranged blocks than those depicted in FIG. 12. Additionally, or alternatively, two or more of the blocks of the method 1200 may be performed in parallel. The method 1200 is an example of one method that may be performed by one or more devices described herein. These one or more devices may perform or may be configured to perform one or more other methods based on operations described herein.

In some implementations, a memory device includes one or more components configured to: identify a list of key-value pair sets ordered by age; select a key-value pair set from the list of key-value pair sets, wherein the key-value pair set includes a plurality of key-value pairs, and wherein the key-value pair set selected from the list of key-value pair sets is an oldest key-value pair set in relation to other key-value pair sets in the list of key-value pair sets; identify, from the key-value pair set selected from the list of key-value pair sets, a first key that is included in at least one other key-value pair set from the list of key-value pair sets, wherein the first key is associated with a first value; identify, from the key-value pair set selected from the list of key-value pair sets, a second key that is not included in at least one other key-value pair set from the list of key-value pair sets, wherein the second key is associated with a second value; form a new key-value pair set that excludes the first key and the first value and includes the second key and the second value based on the first key being included in at least one other key-value pair set and the second key not being included in at least one other key-value pair set; and replace the key-value pair set selected from the list of key-value pair sets with the new key-value pair set.

In some implementations, a method includes selecting a first list of key-value pair sets; selecting a second list of key-value pair sets, wherein key-value pair sets in the first list of key-value pair sets are newer than key-value pair sets in the second list of key-value pair sets; providing the first list of key-value pair sets and the second list of key-value pair sets to a merge loop process; obtaining a first key-value pair and a second key-value pair from the merge loop process; forming a new key-value pair set that excludes the first key-value pair and includes the second key-value pair in accordance with a set of rules; and replacing the second list of key-value pair sets with the new key-value pair set.

In some implementations, a system includes memory; and a controller configured to: identify a list of key-value pair sets; determine, from the list of key-value pair sets, a key-value pair set, wherein the key-value pair set is an oldest key-value pair set in relation to other key-value pair sets in the list of key-value pair sets; identify, from the key-value pair set selected from the list of key-value pair sets, a first key that is included in at least one other key-value pair set from the list of key-value pair sets; identify, from the key-value pair set selected from the list of key-value pair sets, a second key that is not included in at least one other key-value pair set from the list of key-value pair sets; form a new key-value pair set that excludes the first key and includes the second key; and replace the key-value pair set selected from the list of key-value pair sets with the new key-value pair set.

In some implementations, a memory device includes one or more components configured to: identify a plurality of key-value pair sets associated with a root node; determine that a plurality of keys in a key-value pair set, of the plurality of key-value pair sets, are associated with a leaf node in a plurality of leaf nodes based on an edge key associated with the leaf node; and associate the key-value pair set with the leaf node based on a renaming of the key-value pair set, wherein the key-value pair set becomes decoupled from the root node.

In some implementations, a method includes identifying a key-value pair set associated with a root node, wherein the key-value pair set includes a plurality of key-value pairs, and wherein the root node is associated with a log-structured merge-tree; determining that a plurality of keys in the key-value pair set are associated with a leaf node based on the plurality of keys corresponding to an edge key associated with the leaf node, wherein the leaf node is associated with the log-structured merge-tree; and associating the key-value pair set with the leaf node based on a metadata update of the key-value pair set, wherein the key-value pair set becomes decoupled from the root node.

In some implementations, a system includes memory; and a controller configured to: determine that a size of data in the memory satisfies a first threshold; write the data as a key-value pair set in a root node, wherein the root node is associated with a log-structured merge-tree; determine that a plurality of key-value pair sets in the root node satisfy a second threshold; determine, for each key-value pair set in the plurality of key-value pair sets, whether the key-value pair set satisfies a condition; and perform a first action or a second action involving the key-value pair set and one or more leaf nodes depending on whether the key-value pair set satisfies the condition, wherein the one or more leaf nodes are associated with the log-structured merge-tree.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, the terms "substantially" and "approximately" mean "within reasonable tolerances of manufacturing and measurement." As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:
   one or more components configured to:
   identify a list of key-value pair sets ordered by age;
   select a key-value pair set from the list of key-value pair sets, wherein the key-value pair set includes a plurality of key-value pairs, and wherein the key-value pair set selected from the list of key-value pair sets is an oldest key-value pair set in relation to other key-value pair sets in the list of key-value pair sets;
   identify, from the key-value pair set selected from the list of key-value pair sets, a first key that is included in at least one other key-value pair set from the list of key-value pair sets, wherein the first key is associated with a first value;
   identify, from the key-value pair set selected from the list of key-value pair sets, a second key that is not included in at least one other key-value pair set from the list of key-value pair sets, wherein the second key is associated with a second value;
   form a new key-value pair set that excludes the first key and the first value and includes the second key and the second value based on the first key being included in at least one other key-value pair set and the second key not being included in at least one other key-value pair set; and
   replace the key-value pair set selected from the list of key-value pair sets with the new key-value pair set.

2. The memory device of claim 1, wherein the first key in the key-value pair set that is included in at least one other key-value pair set is a duplicate key that is able to be discarded when forming the new key-value pair set.

3. The memory device of claim 1, wherein the second key in the key-value pair set that is not included in at least one other key-value pair set is kept when forming the new key-value pair set.

4. The memory device of claim 1, wherein other key-value pair sets from the list of key-value pair sets are not replaced with newer key-value pair sets.

5. The memory device of claim 1, wherein the one or more components are configured to select the key-value pair set from the list of key-value pair sets based on a number of unique keys in the key-value pair set in relation to numbers of unique keys in other key-value pair sets from the list of key-value pair sets.

6. The memory device of claim 1, further configured to:
   identify, from the key-value pair set selected from the list of key-value pair sets, a prefix associated with a prefix delete; and
   form the new key-value pair set to exclude the prefix based on no key in at least one other key-value pair set matching the prefix.

7. The memory device of claim 1, wherein the list of key-value pair sets is associated with a log-structured merge-tree.

8. A method, comprising:
selecting a first list of key-value pair sets;
selecting a second list of key-value pair sets, wherein key-value pair sets in the first list of key-value pair sets are newer than key-value pair sets in the second list of key-value pair sets;
providing the first list of key-value pair sets and the second list of key-value pair sets to a merge loop process;
obtaining a first key-value pair and a second key-value pair from the merge loop process;
forming a new key-value pair set that excludes the first key-value pair and includes the second key-value pair in accordance with a set of rules; and
replacing the second list of key-value pair sets with the new key-value pair set.

9. The method of claim 8, wherein the new key-value pair set excludes the first key-value pair in accordance with the set of rules based on the first key-value pair being included in the first list of key-value pair sets.

10. The method of claim 8, wherein the new key-value pair set includes the second key-value pair in accordance with the set of rules based on the second key-value pair being included in the second list of key-value pair sets.

11. The method of claim 8, wherein the first list of key-value pair sets and the second list of key-value pair sets are input key-value pair sets, and the new key-value pair set is an output key-value pair set.

12. The method of claim 8, wherein:
the first key-value pair is associated with a duplicate key and is able to be discarded when forming the new key-value pair set; and
the second key-value pair is kept when forming the new key-value pair set.

13. The method of claim 8, wherein the first list of key-value pair sets is not replaced with other key-value pair sets.

14. The method of claim 8, wherein the first list of key-value pair sets includes sparse key-value pair sets that are ordered by age, and wherein the sparse key-value pair sets include key-value pair sets that are newer than key-value pair sets in the second list of key-value pair sets.

15. The method of claim 8, further comprising:
regenerating an index of sorted keys for the first list of key-value pair sets based on the second list of key-value pair sets being replaced with the new key-value pair set.

16. The method of claim 8, wherein the new key-value pair set inherits value data from the first list of key-value pair sets and creates new value data for the second list of key-value pair sets.

17. The method of claim 8, further comprising:
determining a first amount of key-value data from the second list of key-value pair sets that is used to form the new key-value pair set;
determining a second amount of key data from the first list of key-value pair sets that is used to form the new-key value pair set; and
determining a third amount of duplicate key-value data from the second list of key-value pair sets,
wherein the first list of key-value pair sets and the second list of key-value pair sets are selected based on the first amount, the second amount, and the third amount.

18. A system, comprising:
memory; and
a controller configured to:
identify a list of key-value pair sets;
determine, from the list of key-value pair sets, a key-value pair set, wherein the key-value pair set is an oldest key-value pair set in relation to other key-value pair sets in the list of key-value pair sets;
identify, from the key-value pair set selected from the list of key-value pair sets, a first key that is included in at least one other key-value pair set from the list of key-value pair sets;
identify, from the key-value pair set selected from the list of key-value pair sets, a second key that is not included in at least one other key-value pair set from the list of key-value pair sets;
form a new key-value pair set that excludes the first key and includes the second key; and
replace the key-value pair set selected from the list of key-value pair sets with the new key-value pair set.

19. The system of claim 18, wherein the list of key-value pair sets includes key-value pair sets that are ordered by age, wherein each key-value pair set in the list of key-value pair sets includes a plurality of key-value pairs.

20. The system of claim 18, wherein the key-value pair set is selected from the list of key-value pair sets based on a number of unique keys in the key-value pair set in relation to numbers of unique keys in other key-value pair sets from the list of key-value pair sets.

* * * * *